United States Patent [19]

Katz

[11] Patent Number: 5,828,734

[45] Date of Patent: **\*Oct. 27, 1998**

[54] TELEPHONE INTERFACE CALL PROCESSING SYSTEM WITH CALL SELECTIVITY

[75] Inventor: Ronald A. Katz, Los Angeles, Calif.

[73] Assignee: Ronald A. Katz Technology Licensing, LP, Los Angeles, Calif.

[*] Notice: The portion of the term of this patent subsequent to Oct. 5, 2010, has been disclaimed.

[21] Appl. No.: 132,062

[22] Filed: Oct. 4, 1993

Related U.S. Application Data

[63] Continuation-in-part of Ser. No. 335,923, Apr. 10, 1989, and a continuation of Ser. No. 779,762, Oct. 21, 1991, Pat. No. 5,251,252, which is a continuation of Ser. No. 425,779, Oct. 23, 1989, Pat. No. 5,128,984, which is a continuation-in-part of Ser. No. 312,792, Feb. 21, 1989, which is a continuation-in-part of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned, said Ser. No. 335,923, is a continuation of Ser. No. 194,258.

[51] Int. Cl.⁶ .................................................. H04M 11/00

[52] U.S. Cl. ...................... 379/93.13; 379/93.02; 379/93.03; 379/93.12; 379/88; 379/196; 379/245; 379/222

[58] Field of Search .................................. 379/92, 97, 91, 379/88, 142, 214, 222, 245, 91.01, 91.02, 92.01, 92.03, 93.01, 93.02, 93.13, 93.14, 93.26, 196

[56] References Cited

U.S. PATENT DOCUMENTS

| | | |
|---|---|---|
| 3,644,675 | 2/1972 | Waltington . |
| 4,054,756 | 10/1977 | Cornella et al. . |
| 4,117,278 | 9/1978 | Ehrlich et al. . |
| 4,145,578 | 3/1979 | Orriss . |

(List continued on next page.)

FOREIGN PATENT DOCUMENTS

| | | |
|---|---|---|
| 2009937-2 | 8/1990 | Canada . |
| 0 568 114 A2 | 11/1993 | European Pat. Off. . |
| 0 229 170 B1 | 2/1994 | European Pat. Off. . |
| 0 620 669 A1 | 10/1994 | European Pat. Off. . |
| 0 342 295 B1 | 3/1995 | European Pat. Off. . |
| 9002131 | 8/1990 | France . |
| 4005365 A1 | 8/1990 | Germany . |
| 500138/88 | 1/1988 | Japan . |
| 298158/90 | 12/1990 | Japan . |
| 41855/91 | 2/1991 | Japan . |
| 2 230 403 B | 7/1993 | United Kingdom . |
| WO87/00375 | 1/1987 | WIPO . |
| WO89/02139 | 3/1989 | WIPO . |
| WO93/05483 | 3/1993 | WIPO . |

OTHER PUBLICATIONS

Inquiry Letter To The F.C.C., From Attorneys For the Prior Title Holder Seeking Rulings That A Particular Game Would Not Be Considered A Lottery Under F.C.C. Regulations (Exhibit A).

Reply Letter From The F.C.C. To The Inquiry Lettery Stating The Requested Rulings (Exhibit B).

A page (p. 7) from literature on the Charles Schwab corporation, which is not dated nor identified (Exhibit A).

A page (p. 4) from an annual report dated Mar. 1, 1989, though the actual date on which the report was distributed to the public is unknown (Exhibit B).

(List continued on next page.)

*Primary Examiner*—Stella Woo
*Attorney, Agent, or Firm*—Lyon & Lyon LLP

[57] ABSTRACT

For use with a public telephone network CO incorporating a vast number of terminals T1–Tn, a system CS limits and controls interface access to implement voice-digital communication for statistical processing. The system CS accommodates calls in different modes, e. g. "800", "900" or area code and incorporates qualifying apparatus to restrict against caller misuse. Alternative calling modes are used to reach an interface facility that also affords some control based on calling terminal identification, e. g. as by ANI equipment.

254 Claims, 2 Drawing Sheets

U.S. PATENT DOCUMENTS

| | | | |
|---|---|---|---|
| 4,162,377 | 7/1979 | Mearns . | |
| 4,191,860 | 3/1980 | Weber . | |
| 4,242,539 | 12/1980 | Hashimoto . | |
| 4,320,256 | 3/1982 | Freeman | 379/92 |
| 4,335,207 | 6/1982 | Curtin . | |
| 4,348,554 | 9/1982 | Asmuth . | |
| 4,555,594 | 11/1985 | Friedes et al. . | |
| 4,559,415 | 12/1985 | Bernard et al. . | |
| 4,580,012 | 4/1986 | Matthews et al. . | |
| 4,582,956 | 4/1986 | Doughty . | |
| 4,585,906 | 4/1986 | Matthews et al. . | |
| 4,611,094 | 9/1986 | Asmuth et al. . | |
| 4,697,282 | 9/1987 | Winter et al. . | |
| 4,706,275 | 11/1987 | Kamil . | |
| 4,710,955 | 12/1987 | Kauffman | 379/92 |
| 4,761,684 | 8/1988 | Clark et al. . | |
| 4,763,191 | 8/1988 | Gordon et al. | 379/94 |
| 4,788,715 | 11/1988 | Lee . | |
| 4,797,911 | 1/1989 | Szlam et al. | 379/92 |
| 4,866,756 | 9/1989 | Crane | 379/88 |
| 4,894,857 | 1/1990 | Szlam et al. . | |
| 4,908,850 | 3/1990 | Masson et al. | 379/91 |
| 4,922,522 | 5/1990 | Scanlon | 379/97 |
| 4,942,598 | 7/1990 | Davis . | |
| 4,959,783 | 9/1990 | Scott et al. | 379/97 |
| 4,969,183 | 11/1990 | Reese | 379/92 |
| 4,972,461 | 11/1990 | Brown et al. . | |
| 4,996,705 | 2/1991 | Entenmann et al. | 379/91 |
| 5,083,272 | 1/1992 | Walker et al. | 379/97 |
| 5,097,528 | 3/1992 | Gursahaney et al. . | |
| 5,128,984 | 7/1992 | Katz | 379/92 |
| 5,146,491 | 9/1992 | Silver . | |
| 5,181,238 | 1/1993 | Medamana et al. | 379/91 |
| 5,251,252 | 10/1993 | Katz | 379/92 |
| 5,255,183 | 10/1993 | Katz . | |
| 5,333,185 | 7/1994 | Burke et al. . | |
| 5,353,335 | 10/1994 | D'Urso . | |

OTHER PUBLICATIONS

An early brochure based on a Mar., 1989, survey by Charles Schwab & Co., Inc., (Exhibit C).

A trademark scan (U.S. Feberal) indicating a first date of use for Telebroker in Jun. 18, 1988 (Exhibit D).

A.J. Waite, "Getting Personal With New Technologies For Telemarketers," DM News, Feb. 15, 1987 p. 50 on.

"AT&T 2: Reaches agreement with Rockwell (ROK)", Aug. 26, 1986 – (Press Release).

Adams, Cynthia, "Conversing With Computers", *Computerworld on Communications*, May 18, 1983, vol. 17, No. 20A, pp. 36–44 – (Article).

Advertisement: Cuervo Gold Beach Chair, VoiceMail Int'l, '83.

Emerson, S.T., "Voice Response Systems—Technology to the Rescue for Business Users", *Speech Technology*, Jan./Feb. '93, pp. 99–103 – (Article).

Martin, James, "Design of Man–Computer Dialogues", *IBM System Research Institute*, Chapter 16, pp. 283–306 – (Chapter from a Book).

Kaiserman, D.B., "The Role Of Audio Response In Data Collection Systems", *Proceedings of the Technical Sessions*, Paleis des Expositions, Geneva, Switzerland, Jun. 17–19, 1980, pp. 247–251 – (Article).

Cox, Jr., Floyd, "Flora Fax", Jan. 22, 1986 – (Letter and Advertisements).

Moslow, Jim, "Emergency reporting system for small communities", *Telephony*, Feb. 11, 1985, pp. 30–32, 34 – (Article).

"No. 4 ESS: Mass Announcement Capability," Frank et al, Bell System Technical Journal, vol. 60, No. 6, part 2, Jul./Aug. '81.

Brady, R.L., et al., "Telephone Identifier Interface", *IBM Technical Disclosure Bulletin*, Oct. 1976, vol. 19, No. 5, pp. 1569–1571 – (Article).

Mullen, R.W., "Telephone–home's 'friendliest' Computer", *Inside Telephone Engineer And Management*, May 15, 1985, vol. 89, NO. 10 – (Article).

Winckelmann, W.A., "Automatic Intercept Service", *Bell Laboratories Record*, May 1968, vol. 46, No. 5, pp. 138–143 – (Article).

TELEPHONE INTERFACE CALL PROCESSING SYSTEM WITH CALL SELECTIVITY

RELATED SUBJECT MATTER

This is a continuation of application Ser. No. 07/779,762 filed Oct. 21, 1991, and entitled "Telephone Interface Call Processing System With Call Selectivity", now U. S. Pat. No. 5,251,252, which is a continuation of application Ser. No. 07/425,779 filed on Oct. 23, 1989, and entitled "Telephone Interface Call Processing System With Call Selectivity", now U. S. Pat. No. 5,128,984, which is a continuation-in-part of application Ser. No. 312,792 filed Feb. 21, 1989, and entitled "Voice-Data Telephonic Control System", now U. S. Pat. No. 5,703,929, which is a continuation-in-part of application Ser. No. 07/194,258 filed May 16, 1988, and entitled "Telephonic-Interface Statistical Analysis System", now U. S. Pat. No. 4,845,739, which is a continuation-in-part of application Ser. No. 07/018,244 filed Feb. 24, 1987, and entitled "Statistical Analysis System For Use With Public Communication Facility", now U. S. Pat. No. 4,792,968, which is a continuation-in-part of application Ser. No. 06/753,299 filed Jul. 10, 1985, and entitled "Statistical Analysis System For Use With Public Communication Facility", now abandoned. Also, this application is a continuation-in-part of application Ser. No. 07/335,923 filed Apr. 10, 1989, and entitled "Telephonic-Interface Statistical Analysis System", which is a continuation of application Ser. No. 07/194,258 filed May 16, 1988, and entitled "Telephonic-Interface Statistical Analysis System", now U. S. Pat. No. 4,845,739, which is a continuation-in-part of application Ser. No. 07/018,244 filed Feb. 24, 1987, and entitled "Statistical Analysis System For Use With Public Communication Facility", now U. S. Pat. No. 4,792,968, which is a continuation-in-part of application Ser. No. 06/753,299 filed Jul. 10, 1985, and entitled "Statistical Analysis System For Use With Public Communication Facility", now abandoned. The benefit of the earlier filing dates in the United States is claimed under 35 U. S. C. § 120.

BACKGROUND AND SUMMARY OF THE INVENTION

Recent years have seen a considerable growth in the use of telephonic communications. For example, in various applications, telecommunications applications have expanded to accommodate voice-digital interfaces between computer apparatus and callers at remote telephone terminals. For example, by actuating the push buttons at a remote telephone terminal, a caller controls a computer apparatus to provide various entertainment or information. In using such a system, a caller might telephone a financial service and selectively actuate the telephone key panel to receive information on specific stocks or bonds.

Digital interface systems also have been implemented to utilize digital signals provided independently of the caller's actions. For example, the so-called "ANI" telephone equipment provides digital signals indicating a caller's telephone number. Equipment designated "DNIS" is similarly available to indicate the called number. Thus, digital signals may be provided telephonically to a system associated with individual calling terminals as for identification or other use.

Telephonic games and contests are among the various applications that have been recognized for implementation with telephone interface systems. Such games and contests may be variously presented, as in cooperation with an advertising program for a product or in a lottery format. Generally with respect to such applications, various call modes might be utilized.

Essentially, three telephonic calling modes or services are in widespread use. Specifically, caller-charge or "900" service (including "976" calls) involves a charge to the caller for each call. The "900" calling mode is useful for implementing games and contests with telephone interface systems; however, certain problems are encountered. Specifically, certain telephone terminals, e. g. pay phones, do not accommodate "900" service. Also, with respect to certain forms of games and contests, it is important to offer members of the public an alternative "free" method of participation. In general, the system of the present invention may be employed to implement "900" calling modes while accommodating "free" participation with reasonable control.

Telephone calls may be accommodated without charge using "800" service or calling mode. Generally, the "800" calling mode accommodates free calls by callers in various areas to a particular station incurring the charges. In most applications, it is important to regulate the use of the "800" calling mode. Another calling mode is the traditional method of calling, involving area-code numbers which also includes calls placed within a given area code which do not usually involve a specific charge and usually do not require dialing the area code. One of the problems associated with using the area-code calling mode for interface systems is the vast number of calls. For example, even in association with an advertising campaign, inviting members of the general public to participate in a free contest or game by telephone may prompt an overwhelming response. Accordingly, a need exists for a practical system to control and limit calls to an interface service in the traditional free area-code number mode.

Another aspect of telephonic-interface contests involves zealous or obsessive participants. For example, in a quiz contest, a zealous person might call repeatedly, researching answers to given questions until ultimately a question is repeated. At that time, the caller is ready with an answer and has an unfair advantage in the contest. Thus, a need exists for control within the interface system.

In general, the system of the present invention involves a telephone call processing system for receiving calls from a multitude of terminals in different call modes and for processing calls, as to a game or contest format, with means to limit repeat-call advantages. In a disclosed form, the system implements three calling modes to facilitate various formats while accomplishing certain protection both with regard to the calling mode and contest formats.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENTS

As required, a detailed illustrative embodiment of the present invention is disclosed herein. However, telephone techniques, physical communication systems, data formats and operating structures in accordance with the present invention may be embodied in a wide variety of forms and modes, some of which may be quite different from those of the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
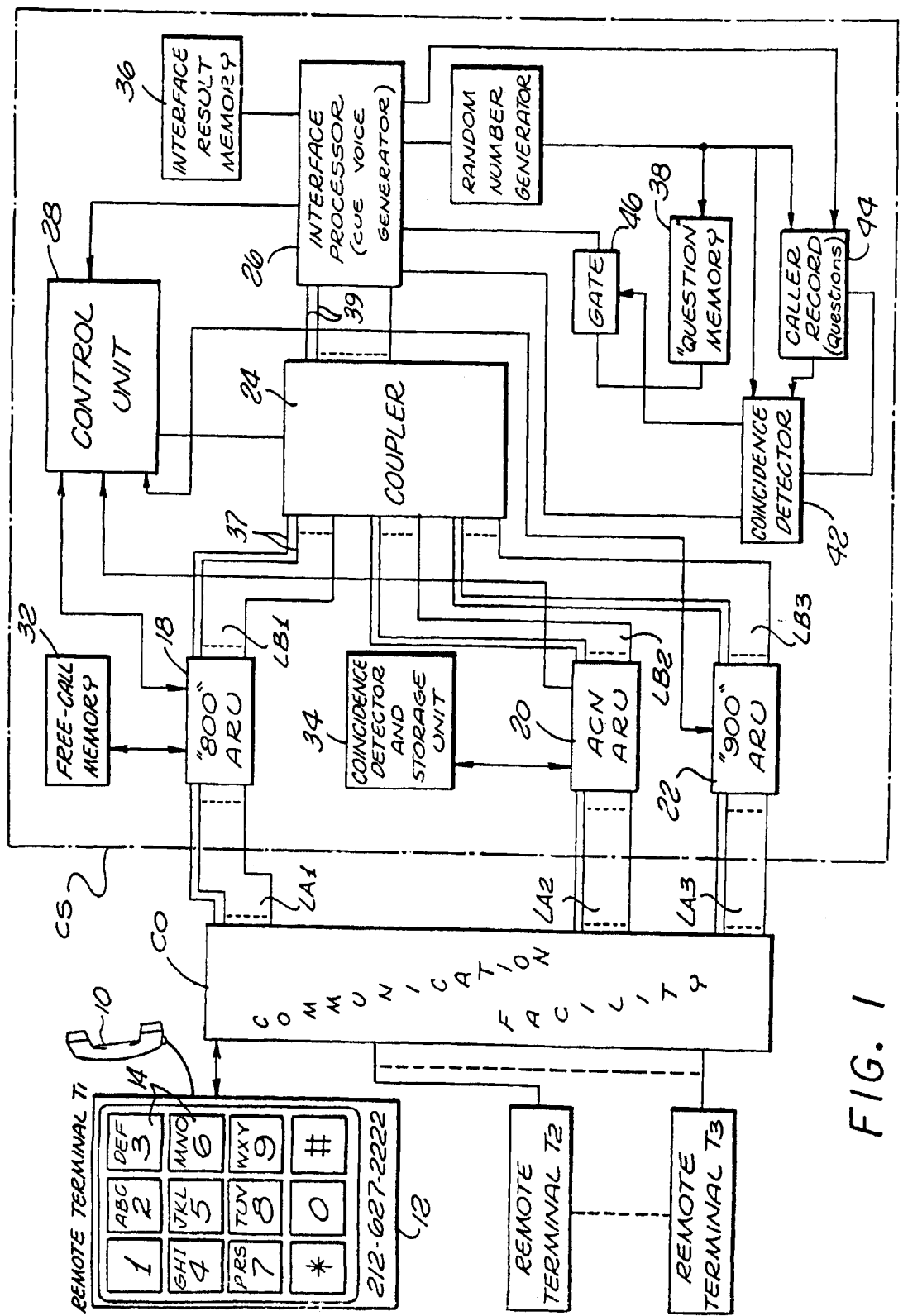
FIG. 1 is a block diagram of a system constructed in accordance with the present invention.

Referring initially to FIG. 1, a series of remote terminals T1–TN (telephone instruments) are represented (left). The terminals T1–TN may be functionally similar and accordingly only the terminal T1 is shown in any detail. The indicated terminals T1–TN represent the multitude of telephone terminals existing in association with a communication facility CO which may comprise a comprehensive public telephone network.

The communication facility CO, accommodating the individual terminals T1–TN, is coupled to a central processing station CS generally indicated within a dashed-line block. In the station CS, to illustrate operating aspects of the present invention, calls are selectively accepted and interfaced so as to accomplish a desired operating format, for example a contest or game.

Generally, calls from the individual terminals T1–TN might be in any of three modes, i. e. the "800" mode, the "900" mode or the area-code mode (traditional area code plus number or local number dialing). In the disclosed illustrative system, depending on individual calling modes, calls are selectively accepted for interface processing. Generally, the interface format accommodates "900" calls with supplemental "800" calls to accommodate both "free" access and all types of telephone terminals. In the disclosed embodiment, calls in the "800" mode are restricted in accordance with prearranged limitations. Furthermore, calls in the area-code mode (from all areas), the 800 mode and 900 mode may be limited to callers having a station number containing a predetermined digit sequence. For example, calls might be restricted to those from terminals having a telephone number ending in the digits "234".

The processing station CS also is controlled to limit the effectiveness of zealous callers. For example, in a contest format, callers may be quizzed with questions randomly drawn from an inventory. In accordance herewith, questions are not repeated to individual telephone terminals T1–TN. Thus, some control is imposed on an aggressive caller who might otherwise be given two opportunities to answer the same question.

Considering the system of FIG. 1 in greater detail, the exemplary telephone terminal T1 includes a handpiece 10 (microphone and earphone) and a panel 12 provided with a rectangular array of individual push buttons 14 in a conventional configuration. Of course, the handpiece 10 accommodates analog signals while the panel 12 is a digital apparatus. During an interface operation, as disclosed in detail below, the caller is queued or prompted vocally through the handpiece 10 (earphone) to provide digital responses using the buttons 14.

At this stage, some specific aspects of the communication interface are noteworthy. Essentially, as a result of telephonic dialing at one of the terminals T1–TN, the communication facility CO couples the select terminal to an audio response unit. Specifically, to illustrate various aspects, three separate audio response units are provided in the station CS to accept calls in the three distinct modes. That is, an audio response unit 18 receives calls in the "800" mode. An audio response unit 20 receives calls in the area-code dialing mode, and an audio response unit 22 receives calls in the "900" dialing mode.

It will be understood that although three separate audio response units are illustrated, systems incorporating the principles of the present invention may well incorporate various numbers of audio response units for each calling mode, with each audio response unit having the capability to accommodate a substantial number of calls as indicated by the lines from the communication facility CO in FIG. 1. Alternatively, a single composite unit might be utilized. Also, the mode or aspects of the described embodiment might well be implemented singly or in various combinations. Herein, for purposes of explanation, calls are treated individually and processed accordingly through the three audio response units 18, 20 and 22.

Generally, the audio response units 18, 20 and 22 connect callers at remote terminals T1–TN from the communication facility CO through a coupler 24 (FIG. 1, station CS, center) to an interface processor 26. Both the coupler 24 and the processor 26 are connected to a control unit 28 that is also connected to the audio response units 18, 20 and 22. Accordingly, with overall supervision by the control unit 28, the audio response units 18, 20 and 22 answer and preliminarily qualify callers from the terminals T1–TN for connection through the coupler 24 to the interface processor 26.

Upon completion of an interface connection in the disclosed embodiment, a contest format is executed by vocally prompting callers to respond with digital data. At this point, it is noteworthy that the communication facility CO also provides identification signals to the audio response units 18, 20 and 22. Specifically, digital identification signals representing numbers associated with the calling terminals T1–TN are provided by "ANI" equipment independent of any action by the caller. In the event "ANI" equipment is not available, callers may be vocally prompted to provide the digital representations by selectively depressing the buttons 14.

The telephone communication facility CO also may provide digital signals indicating the called number. Generally, such a capability involves equipment designated "DNIS". The capability may be useful in various embodiments of the present system, as to distribute calls from a single equipment as mentioned above.

Pursuing the exemplary structure of FIG. 1 in still greater detail, the communication facility CO provides three sets of trunks or lines LA1, LA2 and LA3 respectively coupled to the audio response units 18, 20 and 22. From the audio response units 18, 20 and 22, sets of lines LB1, LB2 and LB3 are connected to the coupler 24. Under control of the control unit 28, the coupler 24 connects individual lines 37 of the sets LB1, LB2 and LB3 to the processor 26 through lines 39.

Generally, the audio response units 18, 20 and 22 may take the form of well known telephonic structures with the capability to "answer" calls and interface callers in a preliminary way. Each of the units 18, 20 and 22 incorporate a voice generator along with some basic programmable logic capability.

The audio response unit 18 is coupled to a free-call memory 32. Generally, the unit 18 in cooperation with the memory 32 operates with the control unit 28 to qualify acceptable calls in the "800" mode.

The audio response unit 20 is connected to a select-number coincidence detector 34. These structures along with the control unit 28 test area-code mode calls. The audio response unit 22 accepts calls without initial qualification.

The system of the disclosed embodiment selectively qualifies callers depending on their calling mode. Additionally, the system responds to caller identification to enhance contest equity. Generally, the interface processor 26 poses questions to calling contestants and stores the resulting answers in a result memory 36. Questions given to contestants are selected from a memory 38 by a random number generator 40. Essentially, the memory 38 contains an inventory of questions addressable by numbers provided by the random number generator 40. The address numbers from the generator 40 are also supplied to a coincidence detector 42 that also receives the address numerals of questions previously presented to a specific caller from a record 44. Thus, before a question is presented to a caller, the number of the calling terminal is checked to assure that the same question has not previously been posed to a caller at that terminal.

If the coincidence detector 42 clears the current question as not being repetitive, a gate 46 is qualified and the question is supplied from the memory 30 to the interface processor 26. A voice generator within the interface processor 26 then provides signals through a designated line 39, the coupler 24, a line 37, one of the audio response units and the communication facility CO to the connected remote terminal. As a result, the caller hears a simulated voice question. The answer is provided by the caller actuating the buttons 14 at the calling terminal. In that regard, the question may be in a multiple choice or true-false format to accommodate simple push button actions at the terminal.

In view of the above description of structural elements in the disclosed embodiment, a comprehensive understanding of the system may now best be accomplished by assuming certain operating conditions and describing the resulting operations. Accordingly, assume that the system CS is programmed to accommodate a relatively simple game format, that is, a sponsored contest for the promotion of a product, e. g. the XYZ Widget. Further assume the contest is of limited participation based either upon: the payment of a token fee ("900" calling mode), prearranged participation ("800" calling mode), lottery selection (area-code calling mode) or lottery selection in combination with either 800 or 900 calling modes. Considering exemplary possibilities of the format, the XYZ Widget might be advertised with an invitation to participate via the "900" calling mode. Alternatively, participants might be variously qualified as by select notification; however, in the exemplary format, such participants would incur a token charge imposed through "900" telephonic service. To consider an example, an offering might be stated: "If your last three phone digits are 972 you may call, 1) if you wish, call 1 900 XXXX972 ($0.95 service charge) provided your last three phone digits are 972; 2) if you have written in for a 'free to enter' you can use the one-time PIN number provided your last three phone digits are 972. In this case you can use the 'free' 800 number provided to you with your PIN number."

As indicated above, some telephone terminals do not accommodate "900" calling mode. Also, under certain circumstances, it is important to afford members of the public "free" access to participate in various games or contests. For example, such participation might be arranged by mail or other communication to provide a participant with a limited-use (i. e. one) qualification number. With use, the numbers are stored in the memory 32 and the list is checked subsequently to avoid repeat use.

A third class of contest participants might be considered lottery winners. For example, the sponsor might televise a drawing of three decimal digits to provide a sequence of three numbers. The three numbers might identify "winning" or "entitled" participants by corresponding to the last three numbers (digits) of their telephone number. For example, the drawing of the numbers "257" would entitle a single call participation from any of the telephone terminals T1–TN designated by a number, the last three digits of which are "257".

In an exemplary contest format, participants might be asked a few test questions (for minor prizes and the ability to participate in a lottery). Of course, a vast. variety of possibilities exist; and in that regard, interim prizes may be awarded to participants as the format proceeds from the initial call to the ultimate prize. At the present point, it is important to appreciate that the system accommodates participants using various telephone call modes with select qualification to participate in an interface format utilizing voice prompt and push-button digital communication. In accordance with the described example, the sponsor invites participants to enter using "900" calling mode service. As a part of such an invitation, persons are advised that "free" entry or participation may be gained by sending a self-addressed envelope to receive an entry number, e. g. eight digits, for use via "800" calling mode service. In the disclosed embodiment, the eight-digit numeral is coded for verification. Of course, numerous possibilities exist. As a simple example the second and sixth digits of the number might have a specific sum, e. g. seven or seventeen. That is, the second and sixth digits might be: three and four, five and two, six and one, seven and zero, nine and eight and so on. A qualifying number would be: "34726313", the second and sixth digits being four and three, respectively.

With the arrangements completed for calling entries in the "900" and "800" mode, the contest might operate for several days before being opened to area-calling participants. That is, the area-calling mode might be available only after a televised drawing entitling participation from a select group of telephone numbers for a limited period of time.

Figure 2:
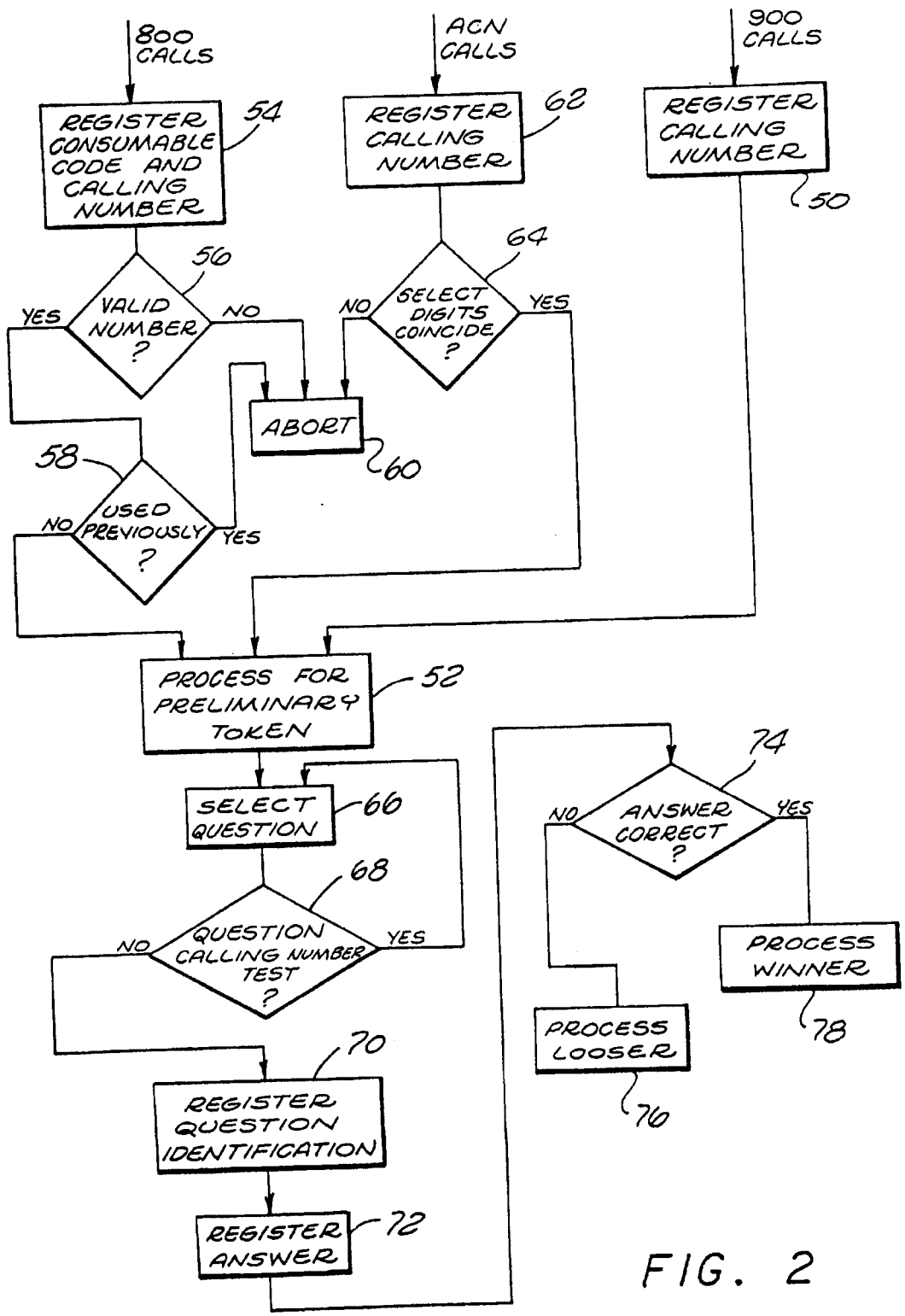
FIG. 2 is a flow diagram of an operating format of the system of FIG. 1.

In view of the above assumptions and descriptions, consider now the operation of the system as depicted in FIG. 1 in relation to the process diagram of FIG. 2. That is, assume the system of FIG. 1 is implemented and programmed to accommodate the exemplary operations as will now be described with reference to the process diagram of FIG. 2.

First, suppose a caller at the terminal T1 places a call in the "900" mode in response to an advertisement by a sponsor promoting XYZ Widgets. Perhaps the caller will receive at least a token gift and might qualify for a major lottery prize.

The assumed call involves the caller actuating the buttons 14 as for example to input: "1 900 5558945". As a result, signals are provided to the communication facility CO resulting in a connection from the remote terminal T1 to the audio response unit 22. With the connection, the communication system CO also provides the audio response unit 22 with digital identification signals representative of the designation for remote terminal T1 ("212 627 2222"). The identification signals are provided by the ANI equipment within the communication facility CO and are registered by the audio response unit 22. The operation is illustrated as a process step in FIG. 2 by the block 50 (upper right) for "900" mode calls.

As suggested above, it may be desirable for a format to provide a token award to all callers in the "900" mode. Recognizing such particulars as possibilities, in the disclosed embodiment, calls in the "900" mode are passed through the audio response unit 22 (FIG. 1) and the coupler 24 to the interface processor 26. Accordingly, the interface processor 26 receives the calling number and processes the contest format as described in detail below.

The initial step of the format common to all call modes is represented by the block 52 in FIG. 2. However, as calls in all modes are processed similarly from that point, before proceeding with the explanation, the preliminary operations attendant other calling modes first will be explained.

As explained above, certain accommodations are made for participation in the "800" (caller free) mode. Accordingly, assume a caller at the terminal T1 has been given an identification number: "34726313" for use in the "800" mode. Accordingly, the caller dials a number, e. g. "800 555 3478", actuating the terminal T1 and the communication facility CO to provide a connection with the audio response unit 18. With communication, the audio response unit actuates an internal voice generator prompting the caller to key in his assigned number, "34726313". As the digits of the number are keyed in by the caller, they are supplied from the audio response unit 18 to the control unit 28 and the free-call memory 32.

Within the control unit 28, logic is provided for verifying the identification number as proper. In accordance with the simple example explained above, the control unit 28 would simply sum the second and sixth digits to test for a total of "7". The coincidence test is represented by the query block 56 in FIG. 2. As indicated above, various codes and verification techniques are well known along with the apparatus for verifying assigned numbers.

If the control unit 28 validates the qualification number "34726313", it is recorded in the free-call memory 32 for future checking against repeat use. Accordingly, each call in the "800" mode also involves a check or test from the audio response unit 18 to the memory 32 to determine whether or not the assigned qualification number has been previously used. The previous-use test is illustrated as a process step by the query block 58 in FIG. 2.

If the control unit 28 determines the qualification number to be invalid or the memory 32 reveals the number has been previously used, the communication is aborted by the audio response unit 18. For example, the audio response unit 18 may be actuated to provide simulated audio signals carrying a message terminating the communication. For example, the caller might be advised: "The number you have provided is not valid. Consequently, your participation cannot be accepted on that basis. " If the entered number is valid and has not been previously used, the tests indicated by the query blocks 56 and 58 (FIG. 2) are positive and the process again proceeds to the common step as indicated by the block 52, e. g. as to receive a token gift.

As indicated above, a third possibility for contest participation involves calling in the area-code mode. While numerous format possibilities exist, as suggested above, access for callers in the area-code mode might be limited to a relatively short period of time. For example, a television program advertising the XYZ Widget might include a drawing to select the telephone terminals from which callers may participate for a period of twenty-four hours. As indicated above, the drawing might identify the last three digits of telephone numbers for the approved terminals.

Following a relatively short time (e. g. one day) during which area-code callers may enter the contest, the contest might be concluded with the ultimate winner or winners determined. In any event, assume the presence of a caller at the terminal T2 with an approved telephone number, i. e. "212 627 2257". Somewhat as explained above with respect to other calling modes, keying operations by the caller at the remote terminal T2 result in a connection through the communication system CO to the audio response unit 20. As previously, the communication facility CO provides digital signals to the audio response unit 20 indicating the calling number (ANI). Thus, the calling number is registered as indicated by the block 62 in FIG. 2. As previously, in the event ANI equipment is not operative to serve the remote terminal T2, then the caller may be asked to key in his telephone number for subsequent verification.

From the audio response unit 20, the caller's number is supplied to the coincidence detector and storage unit 34 for a two-stage test. A first test simply seeks a coincidence between the approved number sequence (three digits) and the last three digits of the calling number. In the example, the last three digits of the calling number ("257") are compared with the select digit sequence, "257". The test is indicated by the query block 64 in FIG. 2.

As a secondary test, the unit 34 may check a record of previous use. Thus, the unit 34 simply implements test logic to accomplish these comparison-step operations with structures as well known in the prior art.

If the tests are negative, as indicated by the query block 64, the communication is aborted as indicated by the block 60. Alternatively, a favorable test again directs the system to proceed to the step of block 52 at which the process enters a common phase for all calling modes.

With the entry of a call into the common phase, the line carrying the call is connected through the coupler 24 (FIG. 1) to the interface processor 26. That is, depending on the call mode, the call is passed through one of the audio response units 18, 20 or 22 and the coupler 24 to the interface processor 26. Note that as indicated above, each of the audio response units 18, 20 and 22 is capable of accommodating a large number of asynchronous calls. Similarly, the coupler 24 is capable of connecting lines from the audio response units 18, 20 and 22 (LB1, LB2 and LB3 respectively) to the interface processor on an individual basis through lines 37 and 39.

The interface processor 26 may comprise a relatively substantial computing capability for processing many individual calls with programmed variations. The processing operation is illustrated in FIG. 2 beginning with the block 52. However, note that as the interface processor 26 receives the telephone number identifying a calling terminal (ANI) reference may be made to a data bank. Therefore, the operation might involve reference to substantial data on a caller. Accordingly, a basis exists for several process variations accommodated by data from a bank. The block 52 represents such possibilities as well as further informing or processing callers.

With the receipt of a call at the interface processor 26, a voice generator may be actuated to specifically inform a caller, depending upon the specific format employed. Essentially, digital signals are provided to actuate a voice generator within the processor 26. Accordingly, an audio message is provided through the coupler 24, the associated audio response unit, and the communication facility CO to the connected remote terminal. Thus, the caller may be further informed or cued.

In the disclosed embodiment, concurrently with the operation of further informing the caller, the interface processor 26 actuates the random number generator 40 to provide a random address for the question memory 38. The process step is illustrated in FIG. 2 by the block 66.

The random number (identifying a question in the memory 38) is also provided to the coincidence detector 42 to test for the previous use of the question to the calling terminal. In that regard, the interface processor 26 provides the caller telephone number (ANI) to the caller record 44 which may simply take the form of a look-up table addressed by calling numbers and revealing the identification of previous questions propounded. The addresses of questions previously recorded for a calling number are supplied to the coincidence detector 42 for comparison with the current tentative question identification number. The process step is illustrated by the query block 68 in FIG. 2.

If the tentative question has been previously used for the calling terminal, a signal is provided from the coincidence detector 42 to the interface processor prompting a repeat operation by the random number generator 40 to select another question.

Alternatively, if the tentative question is not a repeat, then the coincidence detector 42 qualifies the gate 46 and the tentative question is supplied to the interface processor 26 for actual use. Note that upon the occurrence of an approved question, the coincidence detector also supplies a signal to the call record 44 which records the identification number of the question. The process step is illustrated in FIG. 2 by the block 70.

With the provision of signals representing a question through the gate 46 to the interface processor 26, the internal voice generator is actuated to propound the question to the caller. Recognizing the vast possibilities for contest formats, one or more rather difficult questions might be propounded to isolate lottery participants. Alternatively, a relatively easy question may be propounded as a minor obstacle to participation in the final phase of the contest. In any event, as prompted or cued, the caller responds using the buttons 14 and the response is registered for testing within the interface processor 26. The process steps are indicated by the block 72 and the query block 74 in FIG. 2. The results of the tests are then stored in the interface result memory 36. Note that in the interests of human perception, a printed record may be developed concurrently with the qualification of lottery participants.

Final processing to determine a winner or winners may involve any of various operations as a drawing, an event, and so on. Accordingly, as indicated by the blocks 76 and 78, final determinations are made of winners and losers with predetermined prize allocations. Thus, the system of the present invention enables effective regulation and control of interfaces between persons at telephone stations and a central processing apparatus. Calls in various modes are accommodated with appropriate tests, and interface data (e. g. test questions) are qualified.

In view of the above descriptions, it will be apparent that the disclosed embodiment is susceptible to considerable modification in the implementation of the present invention in conjunction with a telephone system to accommodate caller interface operations. Although the disclosed embodiment is directed to a contest, it will be apparent that aspects of the system may be variously embodied to accommodate any of a variety of telephone interface operations. Furthermore, it will be apparent that while the disclosed embodiment comprises specific elements and configurations, any of a variety of structures might well be utilized. Accordingly, the scope hereof is deemed to be as set forth in the claims below.

What is claimed is:

1. A telephone call processing system for receiving calls from a multitude of terminals in different call modes including a caller-charge call mode and at least a toll free call mode for processing to interactive interface formats of a desired application and involving digital signals including digital signals indicative of DNIS, said system comprising:

first response unit means for receiving calls in said toll free call mode with a select called number identified by said digital signals indicative of DNIS;

qualification means for qualifying on-line said calls in said toll free call mode received by said first response unit to provide qualified calls;

second response unit means for receiving calls in said caller-charge call mode with another select called number identified by said digital signals indicative of DNIS;

means for processing calls concurrently in both call modes in accordance with preliminary operations of said toll free call mode and said caller-charge call mode; and means for coupling said qualified calls received by said first response unit means and said calls in said caller-charge mode for concurrent processing in accordance with common operations of said interactive interface formats of said desired application.

2. A telephone call processing system according to claim 1 wherein said qualification means comprises a test structure, for testing said digital signals including digital signals provided by at least certain of said multitude of terminals originating said calls in said toll free call mode.

3. A telephone call processing system according to claim 2, further including limited use memory structure to tally digital signals provided by said multitude of terminals with said toll free call mode to accommodate toll free access and wherein said means for testing tests the content of said limited use memory structure.

4. A telephone call processing system according to claim 1 wherein said interactive interface formats of said desired application relate to a game and said processing means isolates winners based on correct answers provided during said calls.

5. A telephone call processing system according to claim 1, wherein said digital signals indicative of said select called number or said another select called number dialed by callers at said multitude of terminals (DNIS) are provided by a communication facility to identify select interactive interface formats of said desired application selected from a plurality of distinct interactive operating the content of said memory structure. interface formats.

6. A telephone call processing system according to claim 1, wherein said digital signals include digital signals representing calling terminal numbers associated with at least certain of said multitude of terminals automatically provided from a communication facility.

7. A telephone call processing system according to claim 6, further comprising the step of:

means for storing said digital signals representing said calling terminal numbers associated with said multitude of terminals automatically provided from said communication facility.

8. A telephone call processing system according to claim 6, wherein said qualification means for qualifying said calls in said toll free call mode, tests at least certain of said digital signals representing calling terminal numbers associated with at least certain of said multitude of terminals based on limited use.

9. A telephone call processing system according to claim 1, wherein said caller charge call mode is a "900" call mode.

10. A telephone call processing system according to claim 1, wherein said toll free call mode is an "800" call mode.

11. A process for receiving calls through a telephonic communication facility from a multitude of terminals in different call modes including a toll free call mode and a "900" call mode and processing said calls in accordance with respective interactive interface formats for said different call modes, wherein the process involves digital signals including digital signals provided by said multitude of terminals as for identification or data, comprising the steps of:

receiving calls in said toll free call mode;

providing a qualification number to facilitate toll free participation via said toll free call mode;

qualifying on-line said calls in said toll free call mode based on said qualification number to provide qualified calls;

receiving calls in said "900" call mode; and concurrently processing said qualified calls received in said toll free call mode and said calls in said "900" mode in accordance with common operations of interactive interface formats for said toll free and said "900" call modes.

12. A process for receiving calls according to claim 11, wherein at least callers calling in the toll free call mode are subject to limited use.

13. A process for receiving calls according to claim 12, wherein said qualification number is further tested for said limited use during a limited period of time.

14. A process for receiving calls according to claim 11, wherein said qualification number provided by callers during said calls is coded for verification.

15. A process for receiving calls according to claim 14, wherein said qualification number is further tested for said limited use during a limited period of time based upon entitlement.

16. A process for receiving calls according to claim 11, wherein said step of providing a qualification number to a caller includes providing said qualification number by mail.

17. A process for receiving calls according to claim 11, wherein a data bank relating to a caller is accessed to reference data on a caller.

18. A process for receiving calls according to claim 11, wherein digital signals indicative of numbers dialed by callers at said multitude of terminals are provided by said telephonic communication facility (DNIS) to identify said respective interactive interface formats selected from a plurality of distinct interactive operating interface formats.

19. A process for receiving calls according to claim 18, further comprising the step of:

providing preliminary automated greetings specific to said respective interactive interface formats, prior to execution of said common operations of said interactive interface formats.

20. A process for receiving calls according to claim 18, wherein said respective interactive interface formats are associated with an information service.

21. A process for receiving calls according to claim 11, further comprising the steps of:

receiving DNIS signals indicative of a plurality of called numbers to identify select interactive interface formats from a plurality of interactive formats;

receiving caller identification signals indicative of currently active of callers making said calls from said multitude of terminals;

storing one or more caller cues and use indications for said caller cues in relation to said currently active of said callers as identified by said identification signals;

receiving said caller cues to provide responses from said currently active of said callers in the form of digital data signals; and selecting a caller cue for said currently active caller under control of said identification signals and said use indications for said currently active caller whereby to limit and control caller cues provided to individual callers based upon cues previously provided to and identified with said individual callers.

22. A process for receiving calls according to claim 21, further comprising the steps of:

prompting callers calling from said multitude of terminals in said different call modes with multiple questions; and further receiving responses from said callers in the form of digital data developed by said multitude of terminals to isolate a subset of callers.

23. A process for receiving calls according to claim 11, further comprising the steps of:

receiving said qualification number in the form of a caller pin-number as digital signals provided by said multitude of terminals for identification; and said qualifying test including testing to determine if said caller pin-number is eligible to participate.

24. A process for receiving calls according to claim 23, wherein said caller pin-number is tested based on limited use.

25. A process for receiving calls according to claim 11, wherein said toll free call mode is an "800" call mode.

26. A process for receiving calls according to claim 11, further comprising the steps of:

prompting callers calling from said multitude of terminals in said different call modes with multiple questions; and further receiving responses from said callers in the form of digital data developed by said multitude of terminals to isolate a subset of callers.

27. A telephone call processing system for receiving calls through a communication facility from a multitude of terminals in different call modes including at least a caller charge call mode for processing to respective interactive interface formats for said different call modes and involving digital signals including digital signals provided by said multitude of terminals as for identification or data, said system comprising:

first response unit means for receiving calls in said caller charge call mode;

second response unit means for receiving calls in a toll free call mode;

qualification means for receiving and testing calling number identification signals automatically provided by said communication facility to indicate calling terminals numbers for certain of said multitude of terminals to qualify online said calls in said toll free call mode received by said second response unit to provide qualified calls;

means for concurrently processing calls received by both response unit means to preliminary operations of said respective interactive interface formats for said different call modes; and means for coupling said calls received in said caller charge call mode and said qualified calls received in said toll free call mode for concurrent processing in accordance with common operations of said respective interactive interface formats.

28. A telephone call processing system according to claim 27 wherein said qualification means for qualifying calls in said toll free call mode also comprises a test structure for testing at least certain of said digital signals provided by said multitude of terminals originating said calls.

29. A telephone call processing system according to claim 28, wherein said test structure tests at least certain of said digital signals based on limited use.

30. A telephone call processing system according to claim 27 further including a limited use memory structure to tally said digital signals provided by said multitude of terminals with said toll free call mode to accommodate toll free access and wherein said means for testing tests the content of said limited use memory structure.

31. A telephone call processing system according to claim 27, wherein digital signals indicative of numbers dialed by callers at said multitude of terminals (DNIS) are provided by said communication facility to identify said interactive interface formats from a plurality of interactive formats.

32. A telephone call processing system according to claim 27, further comprising:
    third response unit means for receiving calls in a third call mode.

33. A telephone call processing system according to claim 32, wherein said third call mode is an area code call mode.

34. A telephone call processing system according to claim 27, wherein said caller charge call mode is a "900" call mode.

35. A telephone call processing system according to claim 27, wherein said toll free call mode is an "800" call mode.

36. A telephone call processing system according to claim 27, further comprising:
    means for storing said calling number identification signals automatically provided by said communication facility.

37. A telephone call processing system according to claim 27, wherein said qualification means tests said calling number identification signals based on limited use.

38. A telephone call processing system according to claim 27, further comprising preliminary automated greetings specific to said respective interactive interface formats, provided to individual callers prior to execution of said common operations of said respective interactive interface formats.

39. A telephone call processing system for receiving calls from a multitude of terminals in different call modes including a toll free call mode and a caller charge call mode, for processing to respective interactive interface formats for said different call modes and involving digital signals provided by said multitude of terminals as for identification or data, further where said system includes a communication facility which automatically provides digital DNIS signals which identify a number dialed by callers at said multitude of terminals, said digital DNIS signals indicative of the respective interactive interface formats for said different call modes selected, comprising:
    first response unit means for receiving calls in said toll free call mode, and further wherein an interactive interface format for said toll free call mode is identified by said digital DNIS signals;
    qualification means for qualifying on-line said calls in said toll free call mode received by said first response unit means to provide qualified calls, said qualification means comprising means for testing said digital signals provided by said multitude of terminals originating calls in said toll free call mode including caller pin-number data, said caller pin-number data to be tested for approval; and
    second response unit means for receiving calls in said caller charge call mode, further where another interface interactive format for said caller charge call mode is identified by said digital DNIS signals; and
    means for coupling said qualified calls received in said toll free call mode and said calls received by said second response unit means for concurrent processing to common operations of said interactive interface format for said toll free call mode and said interactive interface format for said caller charge call mode.

40. A telephone call processing system for receiving calls according to claim 39, wherein said interactive interface format and said another interactive interface format selected by said digital DNIS signals are selected from a plurality of distinct interactive operating formats.

41. A telephone call processing system for receiving calls according to claim 39, further comprising call record memory means for storing data relating to said calls addressable by said digital signals provided by said multitude of terminals.

42. A telephone call processing system for receiving calls according to claim 41, wherein said digital signals comprise said caller pin-number data.

43. A telephone call processing system for receiving calls according to claim 39, further comprising a test to determine if said caller pin-number data is eligible to participate.

44. A telephone call processing system for receiving calls according to claim 43, wherein said test tests said caller pin-number data for limited use.

45. A telephone call processing system according to claim 39, wherein said qualification means qualifies on-line said calls by testing based on a one time only use.

46. A telephone call processing system according to claim 43, wherein said qualification means further tests said digital signals representing calling terminal numbers based on limited use.

47. A telephone call processing system according to claim 39, wherein said caller charge call mode is a "900" call mode.

48. A telephone call processing system according to claim 39, wherein said toll free call mode is an "800" call mode.

49. A telephone call processing system according to claim 39, further comprising preliminary automated greetings specific to said interactive interface format for said toll free call mode and said another interactive interface format for said caller charge call mode provided to individual callers prior to execution of said common operations.

50. A telephone call processing system for receiving calls from a multitude of terminals in different calling modes including a toll free call mode and a caller charge call mode for processing to respective interactive interface formats for said different calling modes and involving digital signals including digital signals provided by callers at said multitude of terminals as for identification or other use, said system comprising:
    first response unit means for receiving calls in said toll free call mode;
    qualification means for qualifying on-line said calls in said toll free call mode received by said first response unit to provide qualified calls, said qualification means comprising means for testing said digital signals provided by said multitude of terminals and originating calls in said toll free call mode;
    call record memory means for storing data identifying said callers, addressable by said digital signals provided by said callers at said multitude of terminals;
    a second response unit means for receiving calls in said caller charge call mode;

means for concurrently processing calls received by both response unit means for preliminary operations of said respective interactive interface formats; and means for coupling said qualified calls received in said toll free call mode and said calls received by said second response unit means for concurrent processing to common operations of said respective interactive interface formats.

51. A telephone call processing system for receiving calls according to claim 50, wherein each of said respective interactive interface formats is one of a plurality of distinct interactive interface formats and selection of each specific interactive interface format is based on digital DNIS signals automatically provided from a communication facility.

52. A telephone call processing system for receiving calls according to claim 50, wherein said qualification means verifies a caller provided pin-number.

53. A telephone call processing system for receiving calls according to claim 52, wherein said qualification means determines if said caller provided pin-number is eligible to participate.

54. A telephone call processing system for receiving calls according to claim 53, wherein said pin-number is tested for limited use. to select said questions.

55. A telephone call processing system for receiving calls according to claim 54, wherein said limited use is a one time only use.

56. A telephone call processing system for receiving calls according to claim 50, wherein said qualification means qualifies calls on-line based on a caller provided pin-number, said qualification means testing said pin-number for check digit verification.

57. A telephone call processing system according to claim 50, wherein said caller charge call mode is a "900" call mode.

58. A telephone call processing system according to claim 50, wherein said toll free call mode is an "800" call mode.

59. A telephone call processing system for receiving calls according to claim 50, further comprising preliminary automated greetings specific to each of said respective interactive interface formats for said toll free call mode and said caller charge call mode provided to individual callers prior to execution of said common operations of said respective interface formats.

60. A telephone call processing system for receiving calls from a multitude of terminals for processing to an interface format and involving digital signals including digital signals associated with said multitude of terminals as for identification or data, said system comprising:

cue means for prompting responses to questions, from said multitude of terminals in the form of digital signals as data;

question selection means for selecting individual questions from a plurality of questions for actuating said cue means, said question selection means including a random selection means to select said individual questions;

test means for testing said individual questions as correct or incorrect; and processing means to process responses to said individual questions to isolate a subset of callers.

61. A telephone call processing system according to claim 60, further comprising means for receiving and storing caller identification data.

62. A telephone call processing system for receiving calls according to claim 60, wherein said question selection means selects questions from a plurality of batches of question, said plurality of batches distinguished from each other base upon a level of difficulty of the questions in each of said batches.

63. A telephone call processing system for receiving calls according to claim 60, wherein a random number generator is used to select said questions.

64. A telephone call processing system for receiving calls through a telephonic communication facility from a multitude of terminals in a caller charge call mode for processing data in accordance with any of a plurality of interactive operating process formats and involving digital signals including digital signals indicative of DNIS, said system comprising:

first response unit means for receiving calls in a caller charge call mode wherein digital signals indicative of one of a plurality of distinct called numbers (DNIS) identifies one of said plurality of interactive operating process formats;

second response unit means for receiving calls in a "900" caller charge call mode wherein digital signals indicative of one other of said plurality of called numbers (DNIS) identifies another of said plurality of interactive operating process formats;

voice generator means for prompting callers with voice prompts whereby callers enter data in response to said voice prompts;

qualification means for qualifying on-line at least said calls utilizing said one other of said plurality of called numbers in said "900" caller charge call mode received by said second response unit to provide qualified calls;

means for processing qualified calls received by said second response unit means and said calls received by said first response unit means for concurrent processing of data in accordance with at least certain common operations of said one and said another of said plurality of interactive operating process formats; and audio control unit coupled to said voice generator for providing a distinct automated greeting under control of said digital signals (DNIS) to callers calling at least said one of said distinct called numbers identifying said one of said plurality of interactive operating process formats.

65. A telephone call processing system according to claim 64, wherein said voice generator means prompts responses to at least one question in the form of interactively entered data provided by said callers calling at least one of said distinct called numbers; and said system further comprises:

means for storing said interactively entered data.

66. A telephone call processing system according to claim 64, further comprising:

means for receiving digital signals representing calling terminal numbers associated with at least certain of said multitude of terminals automatically provided from said telephonic communication facility.

67. A telephone call processing system according to claim 66, further comprising:

means for storing digital signals representing calling terminal numbers associated with said multitude of terminals automatically provided from said telephonic communication facility.

68. A telephone call processing system according to claim 64, wherein said qualification means tests digital signals representing calling terminal numbers associated with at least certain of said multitude of terminals automatically provided from said telephonic communication facility.

69. A telephone call processing system according to claim 68, wherein said qualification means tests said digital signals representing said calling terminal numbers based on limited use.

70. A telephone call processing system according to claim 64, further comprising:

means for providing identification signals to said qualification means indicative of currently active of said callers;

memory means for storing one or more caller cues and use indications for said caller cues in relation to said currently active of said callers as identified by said identification signals;

cue means for receiving said caller cues to provide responses from said currently active callers in the form of digital data signals; and means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said individual callers.

71. A telephone call processing system according to claim 64, wherein said means for processing processes caller entered data to isolate a subset of said callers.

72. A telephone call processing system according to claim 71, wherein said means for processing utilizes multiple comparative processing operations to isolate said subset of callers.

73. A telephone call processing system according to claim 64, wherein said interactive operating processing format is a form of an information service format.

74. A telephone call processing system according to claim 73, wherein said PIN number data is further tested for limited use during a limited period of time based upon entitlement.

75. A telephone call processing system according to claim 73, wherein said means for processing calls isolates a subset to callers based upon data entered by said callers responsive to prompting by said voice generate means and wherein said means for processing calls further isolates a sub-subset of callers also responsive to further data entered by said callers responsive to further prompting by said voice generator means.

76. A telephone call processing system according to claim 64, wherein qualification by said qualification means of said calls includes qualification of caller provided identification data.

77. A telephone call processing system according to claim 76, wherein said caller provided identification data further includes PIN number data.

78. A telephone call processing system according to claim 64, wherein said caller charge call mode is a "900" call mode.

79. A telephone call processing system according to claim 64, wherein said means for concurrently processing isolates a subset of callers based upon data entered by said callers responsive to prompting by said voice generator and wherein said means for concurrently processing further isolates a sub-subset of callers also responsive to further data entered by said callers responsive to further prompting by said voice generator.

80. A telephone call processing system according to claim 64, wherein said first response unit means receives calls in a "900" caller charge call mode.

81. A telephone call processing system for receiving calls through a telephonic communication facility from a multitude of terminals in a toll free call mode for processing data in accordance with any of a plurality of interactive operating process formats and involving digital signals including DNIS, said system comprising:

first response unit means for receiving calls in said toll free call mode wherein digital signals indicative of at least one of a plurality of distinct called numbers (DNIS) identify one of said plurality of interactive operating process formats;

voice generator means for prompting callers with voice prompts whereby said callers enter data in response to said voice prompts;

qualification means for qualifying on-line at least said calls utilizing said one of said plurality of distinct called numbers (DNIS) in said toll free call mode received by said first response unit to provide qualified calls;

second response unit means for receiving calls in said toll free call mode wherein digital signals indicative of one other of said plurality of distinct called numbers (DNIS) identify another of said plurality of interactive operating process formats;

means for processing qualified calls received by said first response unit means and said calls received by said second response unit means for concurrent processing of data in accordance with at least certain common processing operations of said one and said another of said interactive operating process formats; and audio control unit coupled to said voice generator means for providing a preliminary automated voice prompt to cue callers to interactively enter data under control of said digital signals (DNIS) to callers calling said one other of said plurality of distinct called numbers prior to execution of said common processing operations of said one and said another of said interactive operating process formats.

82. A telephone call processing system according to claim 81, wherein qualification of said calls in said toll free call mode is based upon a test of caller provided identification data based upon limited use.

83. A telephone call processing system according to claim 82, wherein said limited use is a one-time only use.

84. A telephone call processing system according to claim 82, wherein digital signals indicative of identification data indicate a personal identification number.

85. A telephone call processing system according to claim 82, wherein said limited use limits use by callers during a single period of time.

86. A telephone call processing system according to claim 81, wherein said data includes caller pin-number data which is subject to limited use.

87. A telephone call processing system according to claim 86, further comprising a test for said limited use for said caller pin number data comprising a one time only use test.

88. A telephone call processing system according to claim 86, wherein said data including caller pin-number data is further subject to said limited use during a limited period of time based upon entitlement.

89. A telephone call processing system according to claim 81, wherein said digital signals indicative of at least one of said plurality of distinct called numbers (DNIS) dialed by callers at said multitude of terminals are automatically provided by said telephonic communication facility to identify said one interactive operating process format from said plurality of interactive operating process formats.

90. A telephone call processing system according to claim 81, wherein digital signals representing calling terminal numbers associated with said multitude of terminals are automatically provided by said telephonic communication facility.

91. A telephone call processing system according to claim 90, further including memory means for storing said digital signals.

92. A telephone call processing system according to claim 90, wherein said qualification means tests said digital signals representing calling terminal numbers associated with at least certain of said multitude of terminals, automatically provided from said telephonic communication facility.

93. A telephone call processing system according to claim 92, wherein said qualification means comprises a use limit test of said calling terminal numbers.

94. A telephone call processing system according to claim 81, further including memory means for storing data and control means for restricting the extent of access to said system based on at least one of caller provided data or calling terminal data automatically provided by said telephonic communication facility.

95. A telephone call processing system according to claim 81, wherein said voice generator means prompts responses to at least one voice prompt in the form of interactively entered data provided by said callers calling one of said distinct called numbers.

96. A telephone call processing system according to claim 95, wherein at least certain of said responses are stored.

97. A telephone call processing system according to claim 95, wherein said voice generator means prompts responses to said at least one question upon receiving calling terminal numbers associated with said multitude of terminals, automatically provided by said telephonic communication facility.

98. A telephone call processing system according to claim 81, wherein digital signals representing calling terminal numbers associated with said multitude of terminals automatically provided from said telephonic communication facility are used to access a data bank relating to calls from said multitude of terminals.

99. A telephone call processing system according to claim 98, wherein said databank is updated with data relating to said calling terminal numbers.

100. A telephone call processing system according to claim 81, wherein said qualification means tallies calls placed to one of said toll free call mode distinct numbers up to a predetermined limit.

101. A telephone call processing system according to claim 81, wherein said data entered by said callers is used to update data for said callers in a databank relating to said callers.

102. A telephone call processing system according to claim 81, wherein said qualification means tests calls against a limit of free calls available to callers of at least one of said toll free call mode distinct numbers.

103. A telephone call processing system according to claim 81, further comprising:
means for receiving digital signals representing calling terminal numbers associated with at least certain of said multitude of terminals automatically provided from said telephonic communication facility.

104. A telephone call processing system according to claim 103, further comprising:
means for storing said digital signals representing calling terminal numbers associated with said multitude of terminals, automatically provided from said telephonic communication facility.

105. A telephone call processing system according to claim 104, wherein said digital signals representing calling terminal numbers are tested based on limited use.

106. A telephone call processing system according to claim 81, further comprising:
means for providing identification signals to said qualification means indicative of currently active of said callers;
memory means for storing one or more caller cues and use indications for said caller cues in relation to said currently active of said callers as identified by said identification signals;
cue means for coupling said caller cues to said voice generator means to provide responses from said currently active of said callers in the form of digital data signals; and
means for selecting a caller cue from said memory means for a currently active caller for application to said cue means under control of said identification signals and said use indications stored in said memory means for said currently active caller whereby to limit and control caller cues provided to individual callers based upon cues previously provided to and identified with said individual callers.

107. A telephone call processing system according to claim 81, wherein said means for processing processes data provided by callers to update a databank relating to said callers.

108. A telephone call processing system according to claim 81, wherein said means for processing processes at least a portion of said data entered by said callers in response to said voice generator means to update said caller data in a data bank.

109. A telephone call processing system according to claim 81, wherein said interactive operating process format is an on-line processing format in real-time.

110. A telephone call processing system according to claim 81, wherein said means for processing processes caller entered data to isolate a subset of said callers.

111. A telephone call processing system according to claim 81, wherein said means for processing comprises multiple comparative processing operations to isolate a subset of callers.

112. A telephone call processing system according to claim 81, wherein said one interactive operating process format is a form of a financial information format.

113. A telephone call processing system according to claim 112, wherein said financial information format includes provision of data on stocks and bonds.

114. A telephone call processing system according to claim 113, further comprising:
means for providing identification signals to said qualification means indicative of currently active of said callers;
memory means for storing one or more caller cues and use indications for said caller cues in relation to said currently active of said callers as identified by said identification signals;
cue means for coupling said caller cues to said voice generator means to provide responses from said currently active callers in the form of digital data signals; and
means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said individual callers.

115. A telephone call processing system according to claim 114, wherein digital signals provided by said callers in response to said prompting include personal identification number data.

116. A telephone call processing system according to claim 115, wherein said means for processing processes at least a portion of said data entered by said callers in response to voice prompts to update said caller data in a data bank.

117. A telephone call processing system according to claim 81, wherein said one and said another interactive operating process formats involve the sale of a product.

118. A telephone call processing system according to claim 117, further comprising:
   means for providing identification signals to said qualification means indicative of currently active of said callers;
   memory means for storing one or more caller cues and use indications for said caller cues in relation to said currently active of said callers as identified by said identification signals;
   cue means for coupling said caller cues to said voice generator means to provide responses from said currently active callers in the form of digital data signals; and
   means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said individual callers.

119. A telephone call processing system according to claim 118, wherein digital signals provided by said callers in response to said prompting include personal identification number data.

120. A telephone call processing system according to claim 118, wherein said means for processing processes at least a portion of said data entered by said callers in response to voice prompts to update said caller data in a data bank.

121. A telephone call processing system according to claim 81, wherein said qualification means performs a test based upon caller provision of select digits of caller telephone numbers.

122. A telephone call processing system according to claim 121, wherein at least said select digits of caller telephone numbers are automatically provided by digital signals from the telephonic communication facility.

123. A telephone call processing system according to claim 81, wherein said plurality of interactive operating process formats include both a form relating to an information service and a form relating to the sale of a product.

124. A telephone call processing system according to claim 81, wherein said one and said another interactive operating processing formats relate to an information service.

125. A telephone call processing system according to claim 124, further comprising:
   means for prompting callers calling from said multitude of terminals in said toll free call mode with multiple questions; and
   means for receiving responses from said callers in the form of digital data developed by said multitude of terminals to isolate a subset of callers.

126. A telephone call processing system according to claim 81, wherein qualification by said qualification means of said calls includes qualification of caller provided identification data.

127. A telephone call processing system according to claim 126, wherein said caller provided identification data is indicative of PIN number data.

128. A telephone call processing system according to claim 81, wherein said means for processing isolates a subset of callers based upon data entered by said callers responsive to prompting by said voice generator means and wherein said means for processing further isolates a sub-subset of callers also responsive to further data entered by said callers responsive to further prompting by said voice generator means.

129. A telephone call processing system according to claim 81, wherein said toll free call mode is an "800" call mode.

130. A telephone call processing system according to claim 81, further comprising:
   a third response unit for receiving calls in an area code mode.

131. A telephone call processing system according to claim 81, further comprising:
   means for prompting callers calling from said multitude of terminals in said toll free call mode with multiple questions; and
   means for receiving responses from said callers in the form of digital data developed by said multitude of terminals to isolate a subset of callers.

132. A telephone call processing system for receiving calls from a multitude of terminals in different call modes including a pay to dial call mode on a nationwide network for interactive communication and at least one toll free call mode for processing to respective interactive interface formats for said different call modes and involving digital signals associated with said multitude of terminals as for identification or data, said system comprising:
   first response unit means for receiving calls in said toll free call mode;
   qualification means for qualifying on-line said calls in said toll free call mode received by said first response unit means to provide qualified calls;
   second response unit means for receiving calls in said pay to dial call mode on said nationwide network;
   means for processing calls concurrently in both call modes in accordance with preliminary operations of said respective interactive interface formats for said different call modes; and
   means for coupling said qualified calls received in said toll free call mode and said calls in said pay to dial call mode on said nationwide network for concurrent processing to common operations of said respective interactive interface formats.

133. A telephone call processing system according to claim 132, wherein said pay to dial call mode is a "900" call mode.

134. A telephone call processing system according to claim 132, wherein digital signals indicative of numbers dialed by callers at said multitude of terminals (DNIS) is provided by a communication facility to identify said respective interactive interface formats from a plurality of interactive operating formats.

135. A telephone interface system for individually interfacing callers at a multitude of remote terminals for voice-digital communication through a telephone communication facility, said system comprising:

communication means for establishing telephone communication between callers at certain of said multitude of remote terminals and select interactive operating formats through said telephone communication facility based on digital signals indicative of called numbers dialed by callers, which identify said select interactive operating formats from a plurality of operating formats (DNIS), wherein at least two called numbers identify at least two select interactive operating formats from said plurality of different formats, said communication means also receiving digital signals representing calling terminal number data associated with certain of said multitude of remote terminals automatically provided by said telephone communication facility;

means for receiving identification signals relating to said callers in accordance with one of said at least two select interactive operating formats and providing said identification signals to said communication means to indicate currently active of said callers, wherein a data bank relating to said identification signals is accessed to reference data for a caller;

memory means for storing one or more caller cues and use indications for said caller cues in relation to said currently active of said callers as identified by said identification signals;

cue means for receiving said caller cues to provide voice signals through said communication means to prompt responses from said currently active callers in the form of digital data signals; and means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said individual callers.

136. A telephone interface system according to claim 135 wherein said number dialed by said callers is associated with a toll free call mode.

137. A telephone interface system according to claim 135 wherein said select interactive operating format is accessed by a plurality of distinct called numbers identified by said digital signals and provided via a nationwide network for interactive communication.

138. A telephone interface system according to claim 135 wherein said digital signals (DNIS) are indicative of at least two distinct numbers dialed by callers to access common operations of said one select interactive operating format and another select interactive operating format of said interface system, and at least one of said numbers is associated with a toll free call mode and at least one other of said numbers requiring qualification of said callers based on data provided by said callers against data on said callers stored in a memory means.

139. A telephone interface system according to claim 135 wherein a data bank relating to a caller is accessed to reference data on a caller.

140. A telephone interface system according to claim 135, wherein digital signals representing calling terminal numbers associated with certain of said multitude of remote terminals are automatically provided from a communication facility.

141. A telephone interface system according to claim 135, wherein said one or more caller cues are limited and controlled to avoid duplication of certain of said cues.

142. A telephone interface system according to claim 135, further comprising;

qualification means for limiting access to said select interactive operating formats based on use.

143. A telephone interface system according to claim 142, wherein access to said select interactive operating formats is limited based on a one time only use.

144. A telephone interface system according to claim 135, further comprising:
- a voice generator for providing voice prompts to said callers to enter data; and
- a processor for processing at least a portion of said data to update caller data in a data bank.

145. A telephone interface system according to claim 135, further comprising:
- means for qualifying callers on-line based upon provision of a PIN number including a test of said PIN number for verification of coded data.

146. A telephone interface system according to claim 135, wherein a caller provides a PIN number data as indicated by said identification signals.

147. A telephone call interface according to claim 135, wherein at least certain of said digital signals representing calling terminal number data associated with certain of said multitude of remote terminals are stored.

148. A telephone interface system according to claim 135, wherein said call mode other than the caller charge call mode is a "900" call mode.

149. A telephone interface system according to claim 135, wherein said digital signals representing calling terminal number data are tested based on limited use.

150. A telephone call processing system according to claim 135 wherein said memory stores at least a portion of said digital signals representing calling terminal number data.

151. A telephone call processing system for receiving calls through a telephonic communication facility from a multitude of terminals in different call modes including a toll free call mode, a pay to dial call mode, or an area code call mode for processing to respective interactive interface formats for different call modes and involving digital signals associated with said multitude of terminals as for identification or data, comprising:

first response unit means for receiving calls in said toll free call mode or said area code call mode;

second response unit means for receiving calls in a caller charge call mode;

qualification means for qualifying on-line said calls in said toll free call mode or said area code call mode;

audio control unit coupled to said first and second response units for answering incoming calls received for said first response unit and said second response unit and cuing certain callers subject to qualification by said qualification means; and processing means for selectively processing said calls received by said first response unit in said toll free call mode or said area code call mode with calls received by said second response unit for concurrent processing in accordance with common operations of respective interactive interface formats.

152. A telephone call processing system according to claim 151, wherein said first response unit receives calls only in said toll free call mode.

153. A telephone call processing system according to claim 151, wherein said first response unit receives calls in said pay to dial call mode such as said "900" call mode.

154. A telephone call processing system according to claim 151, wherein said first response unit receives calls only in said area code call mode.

155. A telephone call processing system according to claim 151, wherein digital signals indicative of a number dialed by callers at said multitude of terminals (DNIS) for said toll free call mode or said caller charge mode is provided by said telephonic communication facility to identify each of said respective interactive interface formats.

156. A telephone call processing system according to claim 155, further comprising:
communication means for establishing telephone communication between callers at certain of said multitude of terminals and each of said respective interface formats;
means for providing identification signals to said communication means indicative of currently active of said callers;
memory means for storing one or more caller cues and use indications for said caller cues in relation to said currently active of said callers as identified by said identification signals;
cue means for receiving said caller cues to provide responses from said currently active callers in the form of digital data signals; and
means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said individual callers.

157. A telephone call processing system according to claim 151, wherein said qualification means qualifies on-line said calls by testing identification data provided by said callers based on limited use.

158. A telephone call processing system according to claim 157, wherein said limited use is controlled by digital signals indicative of a calling terminal number automatically provided by said telephonic communication facility.

159. A telephone call processing system according to claim 157, wherein said qualification means further qualifies said calls by testing identification data based on limited use during a limited period of time.

160. A telephone call processing telephone call processing system according to claim 151, further comprising:
means for receiving digital signals representing numbers associated with at least certain of said multitude of terminals automatically provided from said telephonic communication facility.

161. A telephone call processing system according to claim 160, further comprising:
means for storing digital signals representing numbers associated with said multitude of terminals, automatically provided from said telephonic communication facility.

162. A telephone call processing system according to claim 151, wherein said qualification means tests digital signals representing calling terminal numbers associated with at least certain of said multitude of terminals, automatically provided from said telephonic communication facility.

163. A telephone call processing system according to claim 151, wherein digital signals representing calling terminal numbers associated with at least certain of said multitude of terminals automatically provided from said telephonic communication facility are used to access a data bank relating to callers.

164. A telephone call processing system according to claim 151, wherein digital signals indicative of a number dialed by callers at said multitude of terminals (DNIS) is provided by said telephonic communication facility to identify each of said respective interactive interface formats selected from a plurality of distinct interactive operating interface formats.

165. A telephone call processing system according to claim 164, wherein each of said respective interactive interface formats is associated with an information service.

166. A telephone call processing system according to claim 164, wherein said audio control unit provides a preliminary automated greeting under the control of said digital signals (DNIS) to callers calling whereby said preliminary automated greeting is specific to said number dialed by callers and each of said respective interactive interface formats.

167. A telephone call processing system according to claim 151, wherein said qualification means qualifies callers on-line based upon a specified limit on use.

168. A telephone call processing system according to claim 167, wherein said limit on use is a one time only use.

169. A telephone call processing system according to claim 167, wherein said limit on use involves a limited number of uses.

170. A telephone call processing system according to claim 151, wherein each of said respective interactive interface formats is an on-line, real-time processing format.

171. A telephone call processing system according to claim 151, further comprising:
voice generator means for prompting callers with voice prompts.

172. A telephone call processing system according to claim 171, wherein said callers provide answer data in response to said voice prompts.

173. A telephone call processing system according to claim 172, wherein said answer data is used at least in part to update a databank on said callers.

174. A telephone call processing system according to claim 171, wherein said callers are prompted by said voice generator means to provide data, and at least a portion of said data is processed by said processor to update caller data stored in a data bank.

175. A telephone call processing system according to claim 151, wherein said first response unit means receives calls only in said area code mode and said second response unit means receives calls only in said caller charge mode and said system further comprises:
a third response unit means for receiving calls in said toll free call mode.

176. A telephone call processing system according to claim 151, wherein said caller charge call mode is a "900" call mode.

177. A telephone call processing system according to claim 151, wherein said toll free call mode is an "800" call mode.

178. A telephone call processing system for receiving calls through a telephonic communication facility from a multitude of terminals in a toll free call mode comprising a plurality of distinct called numbers associated with said toll free call mode for processing calls to select interactive interface operating formats from a plurality of interactive interface operating formats and involving digital signals including digital signals associated with said multitude of terminals as for identification or data, said system comprising:
first response unit means for receiving calls in said toll free call mode wherein digital signals indicative of at least one of said plurality of called numbers (DNIS)

identifies one of said select interactive interface operating formats from said plurality of interactive interface operating formats;

cue means for providing cues during said calls received by said first response unit means to prompt responses from callers during said calls in the form of interactively entered data;

qualification means for qualifying on-line said calls received by said first response unit means to provide qualified calls based on testing said interactively entered data against other data stored in a memory;

second response unit means for receiving calls in said toll free call mode wherein digital signals indicative of at least one other of said plurality of called numbers identifies another of said select interactive interface operating formats from said plurality of interactive interface operating formats;

means for processing said qualified calls received by said first response unit means and other calls in said toll free call mode received by said second response unit means in accordance with at least certain common operations of said select interactive interface operating formats; and a control unit coupled to said voice generator for providing a preliminary automated voice prompt to cue callers to interactively enter data under control of said digital signals (DNIS) to callers calling at least one of said plurality of distinct numbers prior to execution of said common operations of said select interface formats.

179. A telephone call processing system according to claim 178 wherein said digital signals (DNIS) are indicative of at least two different numbers dialed by callers to access said select interactive interface formats, at least one of said numbers associated with a toll free call mode wherein calls to at least said number associated with said toll free call mode require qualification of said callers based on data provided by said callers against data on said callers stored in a memory means.

180. A telephone call processing system according to claim 178, wherein digital signals representing calling terminal numbers associated with at least certain of said multitude of terminals are automatically provided from said telephonic communication facility.

181. A telephone call processing system according to claim 180, further comprising:

means for storing digital signals representing calling terminal numbers associated with said multitude of terminals, automatically provided from said telephonic communication facility.

182. A telephone call processing system according to claim 178, wherein said qualification means tests at least certain of digital signals representing calling terminal numbers associated with said multitude of terminals, automatically provided from said telephonic communication facility.

183. A telephone call processing system according to claim 178, wherein digital signals representing calling terminal numbers associated with said multitude of terminals automatically provided from said telephonic communication facility are used to access a data bank relating to callers.

184. A telephone call processing system according to claim 178, wherein said means for processing processes data provided by callers to update a databank relating to said callers.

185. A telephone call processing system according to claim 178, wherein said qualification means qualifies on-line said calls based upon a limit on use.

186. A telephone call processing system according to claim 178, wherein said interactively entered data comprises caller pin-number data which is subject to limited use.

187. A telephone call processing system according to claim 186, wherein said data including caller PIN number data is further subject to said limited use during a limited period of time based upon entitlement.

188. A telephone call processing system according to claim 178, further comprising a limited use test for said interactively entered data comprising a one time only use test.

189. A telephone call processing system according to claim 178, further comprising:

memory means for storing said interactively entered data and control means for restricting the extent of access to said system based on at least one of said interactively entered data or calling terminal data automatically provided by said telephonic communication facility.

190. A telephone call processing system according to claim 178, wherein said select interactive interface formats are associated with an information service.

191. A telephone call processing system according to claim 178, wherein said select interactive interface formats provide financial information for stocks and bonds.

192. A telephone call processing system according to claim 178, further comprising:

a third response unit means for receiving calls in a caller charge mode.

193. A telephone call processing system according to claim 178, wherein said interactively entered data provided by callers as qualification data is indicative of a caller PIN number and said caller PIN number facilitates participation during a limited period of time.

194. A telephone call processing system according to claim 193, wherein said PIN number is provided to the caller via mail.

195. A telephone call processing system according to claim 194, wherein said PIN number is associated with a product.

196. A telephone call processing system according to claim 178, wherein said caller provides identification data and other data in addition to said interactively entered data for qualification.

197. A telephone call processing system according to claim 178, further comprising:

voice generator means for prompting callers with at least one question upon receiving calling terminal numbers associated with said multitude of terminals, automatically provided by said telephonic communication facility.

198. A telephone call processing system according to claim 178, further comprising:

a third response unit for receiving calls in an area code mode.

199. A telephone interface system for individually interfacing callers at a multitude of remote terminals for voice-digital communication through a telephone communication facility, said system comprising:

communication means for establishing telephone communication between callers at certain of said multitude of remote terminals and a select interactive operating format through said telephone communication facility based on digital signals indicative of at least one of a plurality of distinct numbers dialed by callers (DNIS) to select said select interactive operating format from a plurality of operating formats;

means for providing identification signals received relating to said callers in accordance with said select interactive operating format to said communication means indicative of currently active of said identification signals relating to said callers;

memory means for storing one or more caller cues and use indications for said caller cues in relation to said currently active of said callers as identified by said identification signals;

cue means for receiving said caller cues to provide responses from said currently active callers in the form of digital data signals;

means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said identification signals relating to said individual callers; and connection means for selectively connecting calls using two select distinct numbers of said plurality of distinct numbers to common operations of said select interactive operating format and another select interactive operating format, wherein digital signals (DNIS) indicative of said two select distinct numbers identify said select interactive operating format and said another select operating format.

200. A telephone interface system according to claim 199, wherein said plurality of distinct numbers dialed by callers are associated with different call modes including a toll free call mode and a caller charge call mode.

201. A telephone interface system according to claim 199, further comprising:

qualification means for qualifying on-line said calls for at least one of said called numbers.

202. A telephone interface system according to claim 199, further including memory means for storing data and control means for restricting the extent of access to said system based on at least one of caller provided data or a calling terminal number automatically provided by a communication facility.

203. A telephone interface system according to claim 199, wherein said identification signals relating to said individual callers include digital signals representing calling terminal numbers associated with at least certain of said multitude of remote terminals automatically provided by said communication facility.

204. A telephone interface system according to claim 203, further comprising:

means for storing at least certain of said digital signals representing calling terminal numbers associated with said certain of said multitude of remote terminals, automatically provided by said communication facility.

205. A telephone interface system according to claim 199, wherein said caller cues are limited and controlled to avoid duplication of certain of said cues.

206. A telephone interface system according to claim 199, further comprising:

means for receiving digital signals representing calling terminal numbers associated with at least certain of said multitude of remote terminals automatically provided from a communication facility.

207. A telephone interface system according to claim 190, further comprising: qualification means for testing digital signals representing calling terminal number data associated with said multitude of remote terminals, automatically provided from a communication facility.

208. A telephone interface system according to claim 199, wherein digital signals representing calling terminal numbers associated with said multitude of remote terminals automatically provided from a communication facility are used to access a data bank relating to callers.

209. A telephone interface system according to claim 208, wherein said select interactive operating format is identified from a plurality of formats by said plurality of called numbers (DNIS).

210. A telephone interface system according to claim 199, wherein said select operating format is selected from a plurality of operating formats under control of said digital signals indicative of said plurality of distinct numbers dialed by callers (DNIS).

211. A telephone interface system according to claim 199, wherein said callers provide PIN number data as further identification data.

212. A telephone interface system according to claim 199, wherein said identification signals are used to access a databank relating to said callers.

213. A telephone interface system according to claim 199, further comprising:

qualification means for testing said identification signals indicative of said currently active of said callers.

214. A telephone interface system according to claim 213, wherein said qualification means tests said identification signals based upon limited use.

215. A telephone interface system according to claim 214, wherein said identification signals include caller PIN number signals which are further tested subject to said limited use during a limited period of time based upon entitlement.

216. A telephone interface system according to claim 199, wherein said memory means further stores data provided by callers to update said memory means.

217. A telephone interface system according to claim 199, wherein said select interactive operating format relates to an information service.

218. A telephone interface system according to claim 199, wherein said select interactive operating format relates to financial information.

219. A telephone interface system according to claim 199, wherein said select interactive operating format involves advertising of a product for sale.

220. A telephone interface system according to claim 199, further comprising:

connection means for selectively connecting calls from at least two of said plurality of distinct numbers dialed by callers to common operations of said interface format.

221. A telephone interface system according to claim 199, wherein said at least two of said plurality of distinct numbers dialed by said callers are "900" numbers.

222. A telephone interface system according to claim 221, wherein said qualification means performs a test with respect to said identification signals based upon a limit on use.

223. A telephone interface system according to claim 199, wherein said caller cues are limited and controlled to avoid duplication of certain of said cues.

224. A telephone interface system according to claim 190, wherein said two select toll free numbers dialed by said callers are two "800" numbers.

225. A telephone interface system according to claim 199, wherein at least two of said plurality of distinct numbers dialed by said callers are two "900" numbers.

226. A telephone interface system according to claim 199, wherein said caller cues are limited and controlled to avoid duplication of certain of said cues.

227. A telephone interface system according to claim 199, wherein said select operating format is selected from a plurality of operating formats under control of said digital signals indicative of said plurality of distinct numbers dialed by callers (DNIS).

228. A telephone interface system according to claim 199, further comprising:

qualification means performs a test with respect to said identification signals based upon a limit on use.

229. A telephone interface system according to claim 199, further comprising:

audio control unit for providing a preliminary automated greeting under control of said digital signals (DNIS) to callers calling at least one of said two select toll free numbers prior to execution of said common processing operations of said select interactive operating format and said another interactive select operating format.

230. A telephone call processing system for individually interfacing callers at a multitude of remote terminals for voice-digital communication through a telephone communication facility, said system comprising:

communication means for establishing telephone communication between callers at certain of said multitude of remote terminals and select interactive operating formats through said telephone communication facility based on digital signals indicative of select called numbers dialed by callers (DNIS) to identify said select interactive operating formats from a plurality of interactive operating formats, wherein at least two select called numbers are associated with a pay to dial call mode and a second call mode for accessing said select interactive interface formats;

audio control unit coupled to said communication means for providing preliminary automated greetings to callers calling in both said pay to dial and said second call modes, each of said preliminary automated greetings distinct from the other and controlled at least in part by said DNIS signals; qualification means for qualifying on-line calls received in at least one of said pay to dial call mode and said second call mode; and connection means for connecting substantially all of said callers calling in said two call modes including qualified calls received in at least one of said pay to dial call mode and said second call mode and other calls received in said two call modes to common processing operations of said select interactive operating formats.

231. A telephone call processing system according to claim 230, wherein digital signals representing calling terminal numbers associated with at least certain of said multitude of remote terminals are automatically provided from a communication facility.

232. A telephone call processing system according to claim 231, further comprising:

means for storing digital signals representing calling terminal numbers associated with said multitude of remote terminals, automatically provided from a communication facility.

233. A telephone call processing system according to claim 230, further comprising:

means for receiving digital signals representing calling terminal numbers associated with at least certain of said multitude of remote terminals automatically provided from a communication facility.

234. A telephone call processing system according to claim 230, wherein said qualification means tests digital signals representing calling terminal numbers associated with at least certain of said multitude of remote terminals, automatically provided from a communication facility.

235. A telephone call processing system according to claim 234, wherein said qualification means tests for a use limit.

236. A telephone call processing system according to claim 230, wherein digital signals representing calling terminal numbers associated with at least certain of said multitude of remote terminals automatically provided from a communication facility are used to access a data bank relating to callers.

237. A telephone call processing system according to claim 230, wherein said second mode is a toll free call mode and said pay to dial mode is a "900" call mode.

238. A telephone call processing system according to claim 230, further comprising:

qualification structure to qualify callers on-line calling in said second mode as a condition to be connected to said common processing operations.

239. A telephone call processing system according to claim 238, wherein said qualification structure qualifies on-line said callers based on a caller entered pin number.

240. A telephone call processing system according to claim 239, wherein said pin number is tested for limited use.

241. A telephone call processing system according to claim 240, further comprising:

means for providing identification signals to said qualification structure indicative of currently active of said callers;

memory means for storing one or more caller cues and use indications for said caller cues in relation to said currently active of said callers as identified by said identification signals;

cue means for coupling said caller cues to said voice generator to provide responses from said currently active callers in the form of digital data signals; and means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said individual callers.

242. A telephone call processing system according to claim 230, further comprising:

voice generator means for prompting callers whereby callers enter data in response to voice prompts.

243. A telephone call processing system according to claim 242, further comprising:

means for processing to isolate a subset of callers based upon data entered by said callers responsive to prompting by said voice generator means and wherein said means for processing further isolates a sub-subset of callers also responsive to further data entered by said callers responsive to further prompting by said voice generator means.

244. A process for receiving calls from a multitude of terminals in different call modes including a toll free call mode and a "900" caller charge call mode and processing to respective interactive interface formats for said different call modes, wherein the process involves digital signals provided by said multitude of terminals as for identification or data, comprising the steps of:

receiving calls in said toll free call mode;

providing a limited-use pin number by mail to facilitate toll free participation via said toll free call mode;

qualifying said calls on-line in said toll free call mode based on said limited-use pin number to provide qualified calls;

receiving calls in said "900" caller charge call mode; and coupling said qualified calls and said calls in said caller charge mode for concurrent processing to common operations of said respective interactive interface formats.

245. A process for receiving calls according to claim 244, further comprising:

receiving digital signals indicative of a number dialed by callers at said multitude of terminals (DNIS) provided by a communication facility to identify each of said respective interactive interface formats selected from a plurality of distinct interactive operating interface formats.

246. A process for receiving calls according to claim 206, wherein said limited-use pin number is coded for verification.

247. A process for receiving calls according to claim 244, wherein use of said limited use pin number is further limited to a period of time.

248. A process for receiving calls according to claim 244, wherein said toll free call mode is an "800" call mode.

249. A process for receiving calls from a multitude of terminals in different call modes including a toll free call mode and a "900" caller charge call mode and processing to respective interactive interface formats for said different call modes, wherein the process involves digital signals provided by said multitude of terminals as for identification in the form of a pin number or other data, comprising the steps of:

receiving calls in said toll free call mode;

providing said pin number to facilitate toll free participation via said toll free call mode during a limited period of time;

qualifying said calls on-line in said toll free call mode based on said pin number to provide qualified calls;

receiving calls in said "900" caller charge call mode; and coupling said qualified calls and said calls in said caller charge mode for concurrent processing to common operations of said respective interactive interface formats.

250. A process for receiving calls according to claim 249, wherein said pin number is a limited-use pin number.

251. A process for receiving calls according to claim 250, wherein said limited-use pin number is coded for verification.

252. A process for receiving calls according to claim 249, further comprising:

receiving digital signals indicative of a number dialed by callers at said multitude of terminals (DNIS) automatically provided by a communication facility to identify each of said respective interactive interface formats selected from a plurality of distinct interactive operating interface formats.

253. A process for receiving calls according to claim 249, wherein said pin number is provided by mail.

254. A process for receiving calls according to claim 249, wherein said toll free call mode is an "800" call mode.

* * * * *

UNITED STATES PATENT AND TRADEMARK OFFICE
CERTIFICATE OF CORRECTION

PATENT NO. : 5,828,734
DATED : October 27, 1998
INVENTOR(S) : Ronald A. Katz

Page 1 of 5

It is certified that error appears in the above-identified patent and that said Letters Patent is hereby corrected as shown below:

Title page,
Beside the heading "Notice:" change Oct. 5, 2010 to -- Jul. 7, 2009 --

Under the heading "Related U.S. Application Data," please see Column 1 (Related Subject Matter) for a complete priority lineage of this patent.

Under the heading "References Cited," change "4,054,756 Cornella et al." to -- 4,054,756 Comella et al. --

Under the heading "References Cited, U.S. PATENT DOCUMENTS," insert the following prior art:

| | |
|---|---|
| 4,071,698 | Bargar, Jr. et al. |
| 4,420,656 | Freeman |
| 4,649,563 | Riskin |
| 4,756,020 | Fodale |
| 4,757,267 | Riskin |
| 4,785,408 | Britton et al. |
| 4,788,682 | Vij et al. |
| 4,788,718 | McNabb et al. |
| 4,797,910 | Daudelin |
| 4,797,913 | Kaplan |
| 4,827,500 | Binkerd et al. |
| 4,852,154 | Lewis et al. |
| 4,897,867 | Foster et al. |
| 4,899,375 | Bauer et al. |
| 4,942,599 | Gordon et al. |
| 4,969,185 | Dorst et al. |
| 4,989,233 | Schakowsky et al. |
| 5,023,904 | Kaplan et al. |
| 5,046,183 | Dorst et al. |

Under the heading "References Cited U.S. PATENT DOCUMENTS," change "4,335,207 Curtin" to -- 4,355,207 Curtin --;

Under the heading "References Cited FOREIGN PATENT DOCUMENTS," insert the following prior art:

1,162,336    2/1984  Canada

UNITED STATES PATENT AND TRADEMARK OFFICE
CERTIFICATE OF CORRECTION

PATENT NO. : 5,828,734
DATED : October 27, 1998
INVENTOR(S) : Ronald A. Katz

It is certified that error appears in the above-identified patent and that said Letters Patent is hereby corrected as shown below:

Under the heading "References Cited OTHER PUBLICATIONS," insert the following prior art:

Ozawa, Y., et al., "Voice Response System and Its Applications", Hitachi Review, Dec. 1979, Vol. 28, No. 6, pp. 301-305 - (Article)

Brochures (TWA Crew Scheduling/PSA's Reservation System/Universal Studios Program/Dow Phone):

"AVIAR The communication system that keeps you flying", VoiceMail Int'l, - (Brochure)

"TWA VOICEMAIL, Flight Attendants Users Guide" Aug. 1986, - (Brochure)

Holtzman, Henry, "Voice Mail Soars At TWA", Modern Office Technology (Reprint), Mar. 1986, - (Article)

"Bid Results via VOICEMAIL - Flight Deck Crew Members", May 1, 1985 (Script)

Borden, W.S., "Flight Attendant Self Input Of Monthly Bids Via Touch Tone Telephone", In-Flight Services Bulletin, Sept. 15, 1985 - (Memo)
"Look Ma, no operators! Automatic voice system does many airline jobs", Air Transport World, Oct. 1986 - (Article)

"1,000,000 Shares Common Stock" Voicemail International, Inc., Jan 10, 1984 - (Public Offering Summary)

Levinson, S.E., et al., "A Conversational-Mode Airline Information and Reservation System Using Speech Input and Output", The Bell System Technical Journal, Jan. 1980, Vol. 59, No. 1, pp. 119-137 - (Chapter from a Book)

Corbett, A.J., "Telephone Enquiry System Using Synthetic Speech", University of Essex, Dec. 1974, (Thesis)

Sagawa, S., et al., "Automatic Seat Reservation By Touch-Tone Telephone", Second USA Japan Computer Conference, 1975, Vol. 2, pp. 290-294 - (Article)

UNITED STATES PATENT AND TRADEMARK OFFICE
CERTIFICATE OF CORRECTION

PATENT NO. : 5,828,734  
DATED : October 27, 1998  
INVENTOR(S) : Ronald A. Katz Page 3 of 5

It is certified that error appears in the above-identified patent and that said Letters Patent is hereby corrected as shown below:

Hester, S.D., et al., "The AT&T Multi-Mode Voice Systems - Full Spectrum Solutions For Speech Processing Applications", Sept. 1985, pp. 1-10 - (Proceedings Of The 1985 AVIOS Conference)

Moosemiller, J.P., "AT&T's CONVERSANT™ I Voice System" Speech Technology, Mar/Apr. 1986, pp. 88-93 - (Article)

"Chapter I General Description" D.I.A.L. PRM/Release 3 - Version 2 Mar. 1987 (Product Reference Manual)

Perdue, R.J., et al., "Conversant 1 Voice System: Architecture and Applications", AT&T Technical Journal, Sept/Oct. 1986 - (Article)

Column 1,  
Line 26, after the text "continuation-in-part of" insert the following:

-- Application Serial No. 08/306,751 filed September 14, 1994, and entitled "Multiple Format Telephonic Interface Control System", which is a continuation of Application Serial No. 08/047,241 filed April 13, 1993, and entitled "Multiple Format Telephonic Interface Control System", now United States Patent No. 5,351,285, which is continuation-in-part of Application Serial No. 07/640,337 filed January 11, 1991, and entitled "Telephonic-Interface Statistical Analysis System", which is a continuation of --

Column 6,  
Line 10, delete the period after "vast".

Column 7,  
Line 45, insert a new paragraph after "basis."

Column 12,  
Line 56, change "online" to -- on-line --.

Column 14,  
Line 34, change "43" to -- 256 --.

Column 15,  
Line 24, delete "to select said questions."

UNITED STATES PATENT AND TRADEMARK OFFICE
CERTIFICATE OF CORRECTION

PATENT NO. : 5,828,734
DATED : October 27, 1998
INVENTOR(S) : Ronald A. Katz

It is certified that error appears in the above-identified patent and that said Letters Patent is hereby corrected as shown below:

Column 17,
Line 36, change "73" to -- 76 --.
Line 42, change "generate" to -- generator --.

Column 24,
Lines 62-64, delete claim 153.

Column 25,
Line 42, after the first "processing" delete "telephone call processing".

Column 29,
Lines 59-64, delete claim 206.
Line 65, change "190" to -- 199 --.

Column 30,
Lines 13-17, delete claim 210.
Lines 47-51, delete claim 220.

Column 31,
Line 42, after "signals;" insert a paragraph break.

Column 33,
Line 21, change "206" to -- 244 --.

UNITED STATES PATENT AND TRADEMARK OFFICE
CERTIFICATE OF CORRECTION

PATENT NO.   : 5,828,734
DATED        : October 27, 1998
INVENTOR(S)  : Ronald A. Katz It is certified that error appears in the above-identified patent and that said Letters Patent is hereby corrected as shown below:

Column 34,
After line 31, add the following claims:

-- 255. A process for receiving calls according to claim 12, wherein said limited use is a one time only use. --

-- 256. A telephone call processing system according to claim 39, wherein digital signals representing calling terminal numbers associated with at least certain of said multitude of terminals are automatically provided from a communication facility. --

Signed and Sealed this

Twenty-seventh of November, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,828,734  
DATED : October 27, 1998  
INVENTOR(S) : Ronald A. Katz Page 1 of 5

It is certified that error appears in the above-identified patent and that said Letters Patent is hereby corrected as shown below:

Title page,  
Beside the heading "Notice:" change Oct. 5, 2010 to -- Jul. 7, 2009 --

Under the heading "Related U.S. Application Data," please see Column 1 (Related Subject Matter) for a complete priority lineage of this patent.

Under the heading "References Cited," change "4,054,756 Cornella et al." to -- 4,054,756 Comella et al. --

Under the heading "References Cited, U.S. PATENT DOCUMENTS," insert the following prior art:

| | |
|---|---|
| 4,071,698 | Bargar, Jr. et al. |
| 4,420,656 | Freeman |
| 4,649,563 | Riskin |
| 4,756,020 | Fodale |
| 4,757,267 | Riskin |
| 4,785,408 | Britton et al. |
| 4,788,682 | Vij et al. |
| 4,788,718 | McNabb et al. |
| 4,797,910 | Daudelin |
| 4,797,913 | Kaplan |
| 4,827,500 | Binkerd et al. |
| 4,852,154 | Lewis et al. |
| 4,897,867 | Foster et al. |
| 4,899,375 | Bauer et al. |
| 4,942,599 | Gordon et al. |
| 4,969,185 | Dorst et al. |
| 4,989,233 | Schakowsky et al. |
| 5,023,904 | Kaplan et al. |
| 5,046,183 | Dorst et al. |

Under the heading "References Cited U.S. PATENT DOCUMENTS," change "4,335,207 Curtin" to -- 4,355,207 Curtin --;

Under the heading "References Cited FOREIGN PATENT DOCUMENTS," insert the following prior art:

1,162,336    2/1984 Canada

UNITED STATES PATENT AND TRADEMARK OFFICE
CERTIFICATE OF CORRECTION

PATENT NO. : 5,828,734
DATED : October 27, 1998
INVENTOR(S) : Ronald A. Katz

It is certified that error appears in the above-identified patent and that said Letters Patent is hereby corrected as shown below:

Under the heading "References Cited OTHER PUBLICATIONS," insert the following prior art:

Ozawa, Y., et al., "Voice Response System and Its Applications", Hitachi Review, Dec. 1979, Vol. 28, No. 6, pp. 301-305 - (Article)

Brochures (TWA Crew Scheduling/PSA's Reservation System/Universal Studios Program/Dow Phone):

"AVIAR The communication system that keeps you flying", VoiceMail Int'l, - (Brochure)

"TWA VOICEMAIL, Flight Attendants Users Guide" Aug. 1986, - (Brochure)

Holtzman, Henry, "Voice Mail Soars At TWA", Modern Office Technology (Reprint), Mar. 1986, - (Article)

"Bid Results via VOICEMAIL - Flight Deck Crew Members", May 1, 1985 (Script)

Borden, W.S., "Flight Attendant Self Input Of Monthly Bids Via Touch Tone Telephone", In-Flight Services Bulletin, Sept. 15, 1985 - (Memo)
"Look Ma, no operators! Automatic voice system does many airline jobs", Air Transport World, Oct. 1986 - (Article)

"1,000,000 Shares Common Stock" Voicemail International, Inc., Jan 10, 1984 - (Public Offering Summary)

Levinson, S.E., et al., "A Conversational-Mode Airline Information and Reservation System Using Speech Input and Output", The Bell System Technical Journal, Jan. 1980, Vol. 59, No. 1, pp. 119-137 - (Chapter from a Book)

Corbett, A.J., "Telephone Enquiry System Using Synthetic Speech", University of Essex, Dec. 1974, (Thesis)

Sagawa, S., et al., "Automatic Seat Reservation By Touch-Tone Telephone", Second USA Japan Computer Conference, 1975, Vol. 2, pp. 290-294 - (Article)

UNITED STATES PATENT AND TRADEMARK OFFICE
CERTIFICATE OF CORRECTION

PATENT NO. : 5,828,734
DATED : October 27, 1998
INVENTOR(S) : Ronald A. Katz

Page 3 of 5

It is certified that error appears in the above-identified patent and that said Letters Patent is hereby corrected as shown below:

Hester, S.D., et al., "The AT&T Multi-Mode Voice Systems - Full Spectrum Solutions For Speech Processing Applications", Sept. 1985, pp. 1-10 - (Proceedings Of The 1985 AVIOS Conference)

Moosemiller, J.P., "AT&T's CONVERSANT™ I Voice System" Speech Technology, Mar/Apr. 1986, pp. 88-93 - (Article)

"Chapter I General Description" D.I.A.L. PRM/Release 3 - Version 2 Mar. 1987 (Product Reference Manual)

Perdue, R.J., et al., "Conversant 1 Voice System: Architecture and Applications", AT&T Technical Journal, Sept/Oct. 1986 - (Article)

Column 1,
Line 26, after the text "continuation-in-part of" insert the following:

-- Application Serial No. 08/306,751 filed September 14, 1994, and entitled "Multiple Format Telephonic Interface Control System", which is a continuation of Application Serial No. 08/047,241 filed April 13, 1993, and entitled "Multiple Format Telephonic Interface Control System", now United States Patent No. 5,351,285, which is continuation-in-part of Application Serial No. 07/640,337 filed January 11, 1991, and entitled "Telephonic-Interface Statistical Analysis System", which is a continuation of --

Column 6,
Line 10, delete the period after "vast".

Column 7,
Line 45, insert a new paragraph after "basis."

Column 12,
Line 56, change "online" to -- on-line --.

Column 14,
Line 34, change "43" to -- 256 --.

Column 15,
Line 24, delete "to select said questions."

UNITED STATES PATENT AND TRADEMARK OFFICE
CERTIFICATE OF CORRECTION

PATENT NO.   : 5,828,734                                              Page 4 of 5
DATED        : October 27, 1998
INVENTOR(S)  : Ronald A. Katz It is certified that error appears in the above-identified patent and that said Letters Patent is hereby corrected as shown below:

Column 17,
Line 36, change "73" to -- 76 --.
Line 42, change "generate" to -- generator --.

Column 24,
Lines 62-64, delete claim 153.

Column 25,
Line 42, after the first "processing" delete "telephone call processing".

Column 29,
Lines 59-64, delete claim 206.
Line 65, change "190" to -- 199 --.

Column 30,
Lines 13-17, delete claim 210.
Lines 47-51, delete claim 220.

Column 31,
Line 42, after "signals;" insert a paragraph break.

Column 33,
Line 21, change "206" to -- 244 --.

UNITED STATES PATENT AND TRADEMARK OFFICE
CERTIFICATE OF CORRECTION

PATENT NO. : 5,828,734
DATED : October 27, 1998
INVENTOR(S) : Ronald A. Katz

It is certified that error appears in the above-identified patent and that said Letters Patent is hereby corrected as shown below:

Column 34,
After line 31, add the following claims:

-- 255. A process for receiving calls according to claim 12, wherein said limited use is a one time only use. --

-- 256. A telephone call processing system according to claim 39, wherein digital signals representing calling terminal numbers associated with at least certain of said multitude of terminals are automatically provided from a communication facility. --

This certificate supercedes the Certificate issued on November 27, 2001.

Signed and Sealed this

Twenty-fifth Day of December, 2001

Attest:

Attesting Officer

JAMES E. ROGAN
Director of the United States Patent and Trademark Office

(12) EX PARTE REEXAMINATION CERTIFICATE (10115th)
United States Patent
Katz

(10) Number: US 5,828,734 C1
(45) Certificate Issued: Apr. 15, 2014

(54) TELEPHONE INTERFACE CALL PROCESSING SYSTEM WITH CALL SELECTIVITY

(75) Inventor: Ronald A. Katz, Los Angeles, CA (US)

(73) Assignee: General Electric Capital Corporation, Atlanta, GA (US)

Reexamination Request:
No. 90/008,155, Aug. 7, 2006

Reexamination Certificate for:
| | |
|---|---|
| Patent No.: | 5,828,734 |
| Issued: | Oct. 27, 1998 |
| Appl. No.: | 08/132,062 |
| Filed: | Oct. 4, 1993 |

Certificate of Correction issued Nov. 27, 2001
Certificate of Correction issued Dec. 25, 2001

Related U.S. Application Data

(63) Continuation of application No. 07/779,762, filed on Oct. 21, 1991, now Pat. No. 5,251,252, which is a continuation of application No. 07/425,779, filed on Oct. 23, 1989, now Pat. No. 5,128,984, and a continuation-in-part of application No. 07/335,923, filed on Apr. 10, 1989, which is a continuation-in-part of application No. 07/312,792, filed on Feb. 21, 1989, now Pat. No. 5,073,929, which is a continuation-in-part of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 07/753,299, filed on Jul. 10, 1985, now abandoned, said application No. 07/335,923 is a continuation of application No. 07/194,258.

(51) Int. Cl.
| | |
|---|---|
| *H04M 3/50* | (2006.01) |
| *H04M 3/42* | (2006.01) |
| *A63F 3/08* | (2006.01) |
| *G07C 11/00* | (2006.01) |
| *G07C 15/00* | (2006.01) |
| *H04M 3/36* | (2006.01) |
| *H04M 3/38* | (2006.01) |
| *H04M 3/436* | (2006.01) |
| *H04M 3/46* | (2006.01) |
| *H04M 3/493* | (2006.01) |
| *H04M 3/51* | (2006.01) |
| *H04M 11/00* | (2006.01) |
| *H04Q 3/00* | (2006.01) |
| *H04Q 3/545* | (2006.01) |
| *H04Q 3/66* | (2006.01) |
| *H04Q 3/72* | (2006.01) |
| *H04Q 3/74* | (2006.01) |
| *H04Q 3/64* | (2006.01) |
| *H04M 3/487* | (2006.01) |

(52) U.S. Cl.
USPC .............. 379/93.13; 379/93.02; 379/93.03; 379/93.12; 379/196; 379/245; 379/222; 379/88.2

(58) Field of Classification Search
None
See application file for complete search history.

(56) References Cited

To view the complete listing of prior art documents cited during the proceeding for Reexamination Control Number 90/008,155, please refer to the USPTO's public Patent Application Information Retrieval (PAIR) system under the Display References tab.

*Primary Examiner* — Erik Kielin

(57) ABSTRACT

For use with a public telephone network CO incorporating a vast number of terminals T1-Tn, a system CS limits and controls interface access to implement voice-digital communication for statistical processing. The system CS accommodates calls in different modes, e. g. "800", "900" or area code and incorporates qualifying apparatus to restrict against caller misuse. Alternative calling modes are used to reach an interface facility that also affords some control based on calling terminal identification, e. g. as by ANI equipment.

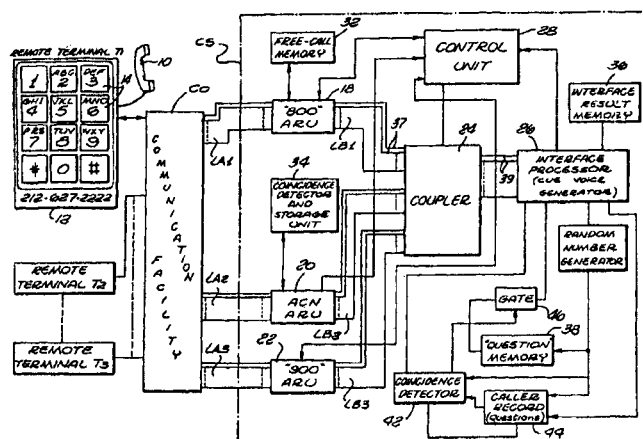

EX PARTE
REEXAMINATION CERTIFICATE
ISSUED UNDER 35 U.S.C. 307

THE PATENT IS HEREBY AMENDED AS
INDICATED BELOW.

AS A RESULT OF REEXAMINATION, IT HAS BEEN
DETERMINED THAT:

Claim 81 is cancelled.

Claims 1-80 and 82-254 were not reexamined.

* * * * *